(12) United States Patent
Mittelmark

(10) Patent No.: US 8,894,741 B2
(45) Date of Patent: Nov. 25, 2014

(54) WATER, LIGHT AND AIRFLOW CONTROL SYSTEM AND CONFIGURATION FOR A PLANT AIR PURIFIER

(75) Inventor: Martin Mittelmark, Schuylerville, NY (US)

(73) Assignee: Marc Anthony Mittelmark, Apex, NC (US)

( * ) Notice: Subject to any disclaimer, the term of this patent is extended or adjusted under 35 U.S.C. 154(b) by 946 days.

(21) Appl. No.: 13/060,668

(22) PCT Filed: Sep. 18, 2009

(86) PCT No.: PCT/US2009/057392
§ 371 (c)(1),
(2), (4) Date: Feb. 24, 2011

(87) PCT Pub. No.: WO2010/033752
PCT Pub. Date: Mar. 25, 2010

(65) Prior Publication Data
US 2011/0154985 A1  Jun. 30, 2011

Related U.S. Application Data

(63) Continuation of application No. PCT/US2009/056581, filed on Sep. 11, 2009.

(60) Provisional application No. 61/098,314, filed on Sep. 19, 2008.

(51) Int. Cl.
| | | |
|---|---|---|
| *B01D 47/00* | (2006.01) | |
| *B01D 53/14* | (2006.01) | |
| *A01G 31/00* | (2006.01) | |
| *A01M 7/00* | (2006.01) | |
| *A01G 25/00* | (2006.01) | |
| *F24F 3/16* | (2006.01) | |
| *A01G 27/00* | (2006.01) | |
| *B01D 53/84* | (2006.01) | |

(52) U.S. Cl.
CPC . *B01D 53/84* (2013.01); *F24F 3/16* (2013.01); *F24F 2003/1653* (2013.01); *A01G 27/00* (2013.01); *B01D 2257/708* (2013.01)
USPC .......... 95/1; 47/59 R; 47/1.7; 47/79; 47/59 S; 95/23; 95/24; 95/26; 96/224; 96/417; 96/422; 96/424

(58) Field of Classification Search
None
See application file for complete search history.

(56) References Cited

U.S. PATENT DOCUMENTS

| 3,717,953 A | 2/1973 | Kuhn et al. |
| 3,969,479 A | 7/1976 | Lonnes et al. |

(Continued)

FOREIGN PATENT DOCUMENTS

| CH | 654978 A5 | 3/1986 |
| DE | 19521239 A1 | 12/1996 |

(Continued)

OTHER PUBLICATIONS

National Aeronautics and Space Administration, Spinoff 2007, Plants Clean Air and Water for Indoor Environments, accessible at http://www.sti.nasa.gov/tto/Spinoff2007/PDF/basic_version_07.pdf, pp. 60-61.

*Primary Examiner* — Duane Smith
*Assistant Examiner* — Pankti Patel
(74) *Attorney, Agent, or Firm* — Jay R. Yablon

(57) ABSTRACT

A plant air purifier and associated method for purifying air, comprising: at least one grow container; a filter bed comprising a surface which is horizontal within 20 degrees of a horizontal plane; at least one plant which grows within the filter bed; a reservoir for containing water for watering the at least one plant; a mechanical watering device which waters the filter bed from the top down; a pump for pumping water from the reservoir to and through the mechanical watering device; and an air propulsion mechanism for propelling air through the filter bed.

44 Claims, 16 Drawing Sheets

(56) References Cited

U.S. PATENT DOCUMENTS

| | | | |
|---|---|---|---|
| 3,991,514 A | 11/1976 | Finck | |
| 4,315,599 A | 2/1982 | Biancardi | |
| 4,784,835 A | 11/1988 | Fritz | |
| 4,844,874 A | 7/1989 | deVries | |
| 4,852,806 A | 8/1989 | Zeman | |
| 4,961,763 A | 10/1990 | Thompson et al. | |
| 4,975,251 A | 12/1990 | Saceman | |
| 5,044,120 A | 9/1991 | Couch | |
| 5,078,972 A | 1/1992 | Saceman | |
| 5,089,036 A * | 2/1992 | Hawes | 96/108 |
| 5,130,091 A | 7/1992 | Saceman | |
| 5,217,696 A | 6/1993 | Wolverton et al. | |
| 5,269,094 A | 12/1993 | Wolverton et al. | |
| 5,277,877 A | 1/1994 | Jeffrey et al. | |
| 5,315,834 A | 5/1994 | Garunts et al. | |
| 5,397,382 A * | 3/1995 | Anderson | 96/135 |
| 5,407,470 A | 4/1995 | Jutzi | |
| 5,430,972 A * | 7/1995 | Wianecki | 47/66.6 |
| 5,433,923 A * | 7/1995 | Wolverton et al. | 422/121 |
| 5,756,047 A | 5/1998 | West et al. | |
| 5,833,293 A | 11/1998 | Ludwig | |
| 5,934,017 A * | 8/1999 | Ho | 47/79 |
| 6,000,559 A | 12/1999 | Stopyra et al. | |
| 6,006,471 A * | 12/1999 | Sun | 47/69 |
| 6,197,094 B1 * | 3/2001 | Thofelt | 95/211 |
| 6,230,437 B1 * | 5/2001 | Wolverton et al. | 47/39 |
| 6,616,736 B2 | 9/2003 | Massey et al. | |
| 6,663,769 B2 | 12/2003 | Hosoya | |
| 6,727,091 B2 * | 4/2004 | Darlington | 435/299.1 |
| 6,921,182 B2 | 7/2005 | Anderson et al. | |
| 8,083,835 B2 | 12/2011 | Mittelmark et al. | |
| 2002/0073613 A1 | 6/2002 | Wijbenga | |
| 2004/0230102 A1 | 11/2004 | Anderson et al. | |
| 2005/0186108 A1 | 8/2005 | Fields | |
| 2005/0274663 A1 * | 12/2005 | Roitman | 210/252 |
| 2007/0058368 A1 | 3/2007 | Partee | |
| 2007/0144067 A1 * | 6/2007 | Farhadi | 47/39 |
| 2011/0162273 A1 | 7/2011 | Mittelmark et al. | |

FOREIGN PATENT DOCUMENTS

| | | |
|---|---|---|
| DE | 19739060 A1 | 9/2000 |
| EP | 478203 A1 | 4/1992 |
| EP | 2042813 A1 | 4/2004 |
| EP | 1416229 A2 | 5/2004 |
| EP | 1563891 A1 | 8/2005 |
| GB | 2297087 A | 7/1996 |
| GB | 2307162 A | 5/1997 |
| WO | 2009048925 A2 | 4/2009 |
| WO | 2009131008 A1 | 10/2009 |
| WO | 2010/033423 A1 | 3/2010 |
| WO | 2010/033752 A1 | 3/2010 |
| WO | 2010/033752 A4 | 3/2010 |

* cited by examiner

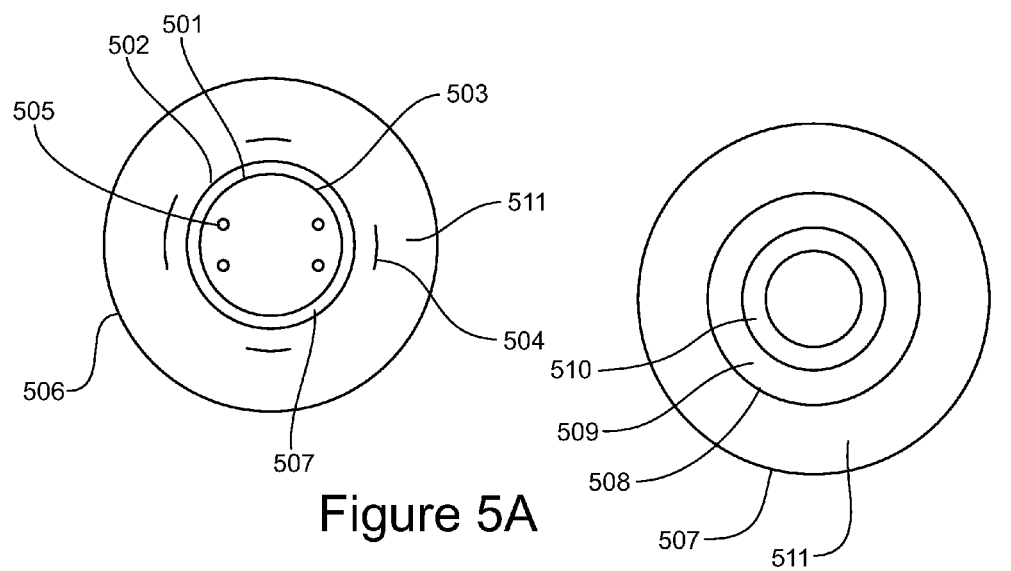
Figure 5A
Figure 5B
Figure 5C
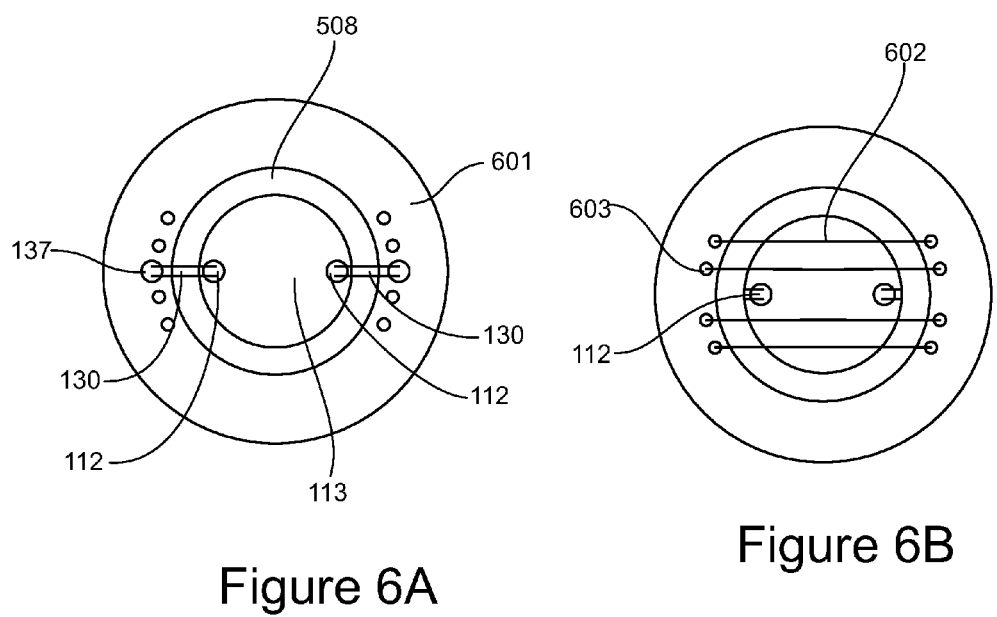
Figure 6A
Figure 6B

WATER, LIGHT AND AIRFLOW CONTROL SYSTEM AND CONFIGURATION FOR A PLANT AIR PURIFIER

CROSS-REFERENCE TO RELATED APPLICATIONS

This application claims benefit of provisional application U.S. 61/098,314 filed Sep. 19, 2008, which is hereby incorporated by reference. This application also claims priority to, and is a continuation-in-part of, application PCT/US09/56581 filed Sep. 11, 2009, which is hereby incorporated by reference, and which in turn claims benefit of said provisional application U.S. 61/098,314 filed Sep. 19, 2008.

BACKGROUND OF THE INVENTION

Plant air purifiers have been on the market for almost twenty years. While they successfully remove volatile organic compounds (VOCs), they have largely not caught on in the consumer and commercial marketplace. This is because they are not user friendly and require constant daily care. Failure to provide such care can result in the system quickly breaking down and the plant(s) therein dying in only a matter of hours. For example, when a portable plant air purifier was placed in a FEMA trailer, it lowered the formaldehyde level from 180 ppb to 30 ppb in just a few days. But at the same time, because the inhabitants of the trailer did not provide adequate water and light to the plant, the plants within the purifier all but died. Thus, there exists a real need to provide plant air purifier which are configured and controlled for very easy maintenance, replacement, use, with minimal time and attention required by the user.

When plants grow in the wild, nature attends to all their needs. Further they do not grow in an artificial soil. They do not have great volumes of air passing through the soil (as they do with a plant air purifier which makes use of air passage through the soil as part of the purification process), drying it out, and so do not require great volumes of water each day to replenish the moisture lost. In order for a portable plant air purifier to perform well it must have mechanisms that automatically attend to the plant's needs with minimal user intervention, or the plant within the plant air purifier cannot be expected to live given the rapid diminishment of moisture resulting from air passing through the soil. Without a living and healthy plant, plant air purifiers cannot effectively be expected to continue to clean the air. Nor will the microorganisms that live in the filter, which bio-regenerate the filter and have a symbiotic relationship with the plants therein, thrive for any length of time.

In addition, for the filter bed within a plant air purifier unit to operate at its most effective level, it must be kept evenly saturated whenever moisture levels drop. Otherwise the microorganisms which live and thrive within that filter bed will not be able to travel throughout that bed and the filter bed will not be bio-regenerated. Specifically, as the filter bed fills with toxic material, it becomes less and less effective and eventually has to be replaced. Lack of moisture within the filter bed leads to eventual saturation of the filter bed with toxins and if the filter bed is not then replaced it spews those toxins into the air, adding further to poor indoor quality air, rather than providing a cure. Further, without sufficient moisture, the filter bed's wet scrubbing ability is greatly reduced and air purification suffers. The moisture needs of plants and plant beds in a plant air purifier with air forced through the soil greatly exceed those of natural or artificial plants and plant beds, and must be properly accommodated by affirmative measure.

Many plant air purifiers rely on wicking or capillary action, where the filter bed wicks up moisture from below, to address the system's moisture needs. Unfortunately, if a plant air purifier is operating on a 24/7 basis, capillary action is simply not fast enough or efficient enough with most artificial or soilless growing matter in the filter bed to attend to a plant air purifier's replenishing moisture needs. So, either the unit must be disabled for quite a number of hours a day, or another method of moisturization must be found, such as using micro irrigation from above with a micro-irrigation system. Specifically, as disclosed in the priority documents referenced above and incorporated here by reference, top down micro irrigation greatly enhances the air purification ability of a portable plant air purifier. Presently no portable plant air purification system appears to use top down micro-irrigation to take care of the plant's and the filter bed's needs.

As things stand now, most plant air purifiers are purchased by people and organizations residing in heavily congested and polluted environments. These urban purchasers are not used to taking care of plants, and definitely not used to taking care of plants in a plant air purifier which requires far more water than a normal plant would require—as much as two quarts of water a day. Very few city dwellers have what is known as a "green thumb." They are very liable to forget the needs of their plants save when such attention is absolutely required and this should not exceed more once a week. They need a plant air purifier which, in effect, takes care of all the plant's needs on "auto-pilot." Further, if people are placed in a stressful environment such as a FEMA trailer referenced above, they barely can take care of themselves, let alone take care of plants. Thus, many of the tasks required to take care of a plant must be automated and the purifier which contains them must have a reservoir sufficient to handle the watering needs of a plant for an entire week. This means that the reservoir should have capacity for three gallons of water, or more.

When, eventually, the water does run low, the user has to be alerted immediately and the air moving mechanism needs to be automatically disabled to conserve what little water remains in both the filter bed and in the plant itself, and the air moving mechanism should not be reactivated again until water in the reservoir is replenished. Alerting the user that the unit needs water can be done with a buzzer, a warning light, or both, or any signaling device known to someone of ordinary skill which is discernable to the user's sensory perceptions. But it is possible that the water might run low at night, in which case one does not want the buzzer to sound and wake up the user. So when, e.g., a moisture sensor within the reservoir or water level sensor in the reservoir senses that the water is low, a light level sensor, e.g., photometer should determine if the room has adequate light, or a clock should determine the time of day (and optionally day of the week) and whether the time is suitable for sounding an alarm (with a suitable time range preferably predetermined by the user). If it is not an appropriate time to sound an audible alarm, only the warning light should go on. And when there is adequate light in the room, say in the morning, or when a suitable time is reached, than the buzzer can go on.

Secondly, in addition to water, the plant air purifier must be capable of properly controlling the lighting requirements of the plant if there is not sufficient ambient light available. Thus there needs to be a grow light which goes on automatically at certain times of the day and/or in response to light levels sensed (including certain required light frequencies) if there is not sufficient light available.

In addition it is senseless to have the plant air purifier operating when no one is in the environment where the purifier is located. It should only operate when needed, and otherwise, it should just grow the plant normally, without circulating air through the soil, and with light provided in a more natural cycle. But this requires a computerized control system with logic responsive to various sensory devices and/or timers which enable the control system to determine how the system should perform and activate and deactivate system components accordingly. In other words what is needed is a sophisticated smart plant air purifier. There is no such unit on the market today.

To be effective a plant air purifier should preferably be programmed to deactivate the air propulsion mechanism for propelling air through the filter bed (e.g., fan), when it on the verge of running out of water. It should preferably have an alarm both visual and audio which alert the user that more water is needed, if it does not have automatic refill capabilities connected to an external water supply. It should preferably be capable of providing light for the plant when and if it is needed. It should preferably use little energy and have parts which are easily replaceable. This includes easy insertion of new, mature, ready-to-purify plants when the unit is first deployed, and easy replacement of plants when a plan has died or when replacement is required for some other reason. It should preferably be programmable regarding when it is to operate and when not, and should preferably have a back up battery in case power to the unit is interrupted so the programmed settings are not erased. If it is not connected to an external water supply, it should preferably have a reservoir capable of storing at least a week's worth of water. As just noted, it is preferred to have a replaceable plant pot (e.g., a pot or tray or chamber, etc.) so that in case the plant or plants within need replacement a replacement plant in a replacement grow pot can easily be inserted. Plus, the plant pot used in the unit should preferably be one within which professional growers can grow one or more plants. By having a plant or plants already grown in a pot or tray which is actually used in the unit, the purchaser does not have to transplant a plant into the pot himself. If the user has to transplant a plant into the growing apparatus himself when he or she first purchases the unit, the plant transplanted will undergo unusual stress and it will require up to 6 weeks for it to fully acclimate. During this time a significantly high percentage of the plants so transplanted might well die, or at the very least the unit will not operate at maximum efficiency.

Up to the present time, no known unit has been available which attends to all these needs. Thus, the invention disclose herein is a sophisticated and smart plant air purifier with a control system (e.g., printed circuit board assembly) and with many devices connected to the control system, which meets all of the foregoing needs and others to be discussed herein.

Dr. B. C. Wolverton in the early 1990's developed a portable plant air purifier which used a hydro culture which cleaned the air with a filter bed which trapped airborne contaminants using plants and microbes therein. Both he and NASA used an induction fan to pull air through a filter bed of various materials. Results of such air purification cleaning are well documented. But little attention has been given to making sure that the average user of such a system will systematically provide the plants with just the right amount of water and light when needed and if this is not done the plants within the plant air purification unit will quickly die, thus severely limiting the plant air purifier's capabilities. See, for example, http://www.nasa.gov/home/hqnews/2007/dec/HQ_07285_Spinoff_2007.html, pages 60 and 61.

Wolverton's U.S. Pat. No. 6,230,437 shows a plant air purifier with what appears to be a horizontal filter bed surface, an induction fan, an adjustable grow light, a removable plant pot and a hat-like seal. Page 2, line 30-33 states: "The shape of the seal is a flat ring whose inside fits the outside of the planter. The later shape allows one to put the seal on the top of the planter." But Wolverton's invention utilizes bottom-up irrigation through wicking and capillary action, which is far left effective than top down micro-irrigation. The lamp used by Wolverton is hot and destroys toxic airborne microbes. A LED lamp is a cool light with a temperature rarely higher than 90 degrees and would be much preferred. Additionally, U.S. Pat. No. 6,230,437 does not disclose, suggest or motivate any sort of "smart" control system to engage in the various functions discussed above to enable simple, automated operation of a plant air purifier. While U.S. Pat. No. 6,230,437 has a replaceable pot, it is disclosed, however, on page 4, line 55 that "[w]hen one wants to replace the plant, the whole planter 1 is replaced." There is no teaching, suggestion or motivation for a system wherein growers might grow the original plant so that the plant becomes acclimated to a soilless medium over many weeks or months in advance, and the plant can be modularly inserted into a plant air purifier and placed into operation immediately with far greater effectiveness. As noted already, failure to have the plant growing for a period of time in the pot to be used within the purifier, or having it transplanted into the purifier pot, can lead in short order to plant stress and possibly plant death. Even if the plant survives it will not operate optimally for quite some time.

U.S. Pat. No. 6,921,182 and pre-grant publication U.S. 2007/0058368, show lighting units which promote plant growth using LEDs of different wave lengths in different configurations. But neither discloses or suggests anything about LED grow lamps being used as part of a plant air purifier. Nor is there any discussion of the use of timers and how and when to use the lights. Rather, U.S. Pat. No. 6,921,182 talks about the arrangement of the different wavelength lights to be used, mentioning how in one case one unit has a first set of orange emitting lights of about 612 nm and a set of red emitting lights with a peak wavelength of about 660 nm, and then adding blue emitting lights. One talks about having the lights use red emitting diodes between 600-700 nm and the other having one or more blue LEDS having wavelengths of 400-520 nm within 1 to 10 inches from above the plant. The first makes use of diodes having an angle of direction of the light at 15 and 30 degrees. Or half the LEDS placed at double the angle of the other. The second uses optics but must have a heat sink.

U.S. Pat. No. 5,407,470 has a plant air purifier which pulls air down through a pipe, and has a sealed area so that air is expelled through the filter bed of a removable plant pot using a substrata with activated carbon in it. It also contains a statement that a water level switch can be connected to a blower. In this way as the water level decreases the output of the blower is increased [sic, should be decreased] until the blower is completely stopped and the device acts as a conventional hydro culture system." Applicant's invention, as will be disclosed herein, shuts the fan off when the water content in the planter goes below a certain point but also has a buzzer and/or a light or other user-discernable signal that the water reservoir is low thus alerting the owner that the plant air purifier system needs water replacement.

U.S. Pat. No. 5,433,923 uses a hot light bulb over which the air passes in a plant air purifier to both "provide sufficient light for plant growth and aesthetics through indirect lighting on the plant's leaves." In the same patent it says that preferably the lights have a significant thermal output so that a heated region around each light bulb serves to significantly reduce any residual microbes. The light is preferably an incandescent or a grow lamp shining upward onto the plant. Passing air, preferably downward though such media and back into the air under hot light bulbs destroys undesirable airborne mold spores (page 2, lines 65-8). The light bulbs may also supply sufficient light for plant growth and/or for aesthetics through indirect lighting of the plant leaves (Page 3, lines 51-3). The container 2 is shown as having a bottom clean air outlet chamber 12 within which is placed a fan 14, electrically motor driven, and controlled by a timer (page 3, 54-57) (the timer does not show in the figures). The light's radiation emissions, and a combination of heat emitted by an incandescent bulb or any ultraviolet light as may be emitted by the growth lamp, serves to significantly reduce any residual microbes or spores emitted in the cleansed or humidified air Applicant's invention, in contrast, utilizes LEDS which have a relatively low heat level and in almost all cases does not make use of an incandescent bulb which is inefficient. It also has a fan controlled by a computerized control system. U.S. Pat. No. 5,433,923 does not provide for the ability to differentiate between week days and weekends of use. Plus it has an annular water reservoir chamber which is approximately the lower half to two thirds of the plant growth pot which decreases the frequency with which water must be added to the pot. This patent deals with a portable plant air purifier where moisture is gotten to the filter bed from the reservoir via capillary water flow therefrom. The present invention uses a pump and than a micro irrigation system with emitters that soak the filter bed from the top down.

U.S. Pat. No. 5,934,017 discloses with a plant air purifier with an external and removable water reservoir which can be of any size. The water reservoir bottle is such that it is easy to turn it over for insertion into the planter. Water rises in the grow pot from the bottom up through capillary action along with the suction of the root system. The lamp utilized in this invention is to heat the air and cause the air to rise. The invention disclosed here has an internal water reservoir, and also uses a mechanical air propulsion mechanism rather than heat to bring about air movement.

U.S. Pat. No. 6,727,091 discloses a plant wall where plants are grown so that the plants grow up the wall and the roots are inserted into a fibrous material. Water from a reservoir is pumped up a pipe and the water system is designed to deliver water evenly across the width of the matrix panel whereby water trickles down evenly over the entire matrix panel. Basically the filter bed has its top near the ceiling and its bottom near the floor. This is further verified by the fact that the patent says "The plants should be such that they root evenly through the matrix panel 32 and will support themselves physically with their roots embedded in a near-vertical matrix panel." (Page 7, lines 18-21) Surely this system could have more than 3 gallons of water in it. The filter bed of U.S. Pat. No. 6,727, 091 is not on a horizontal plane or close thereto. Additionally, one would infer from FIG. 1 that the unit has a water intake port which would be connected to the indoor plumbing. Makeup water appears to be supplied through water intake port 42. (Page 6, lines 39-40) "Periodically the water in the tank should be drained off (drain 45) and replaced with clean water" (Page 6, lines 54-55). However, there is no mention of automating the processes or of using a solenoid or a computerized control system which is programmed to deal with certain emergencies such as when water in the reservoir goes above a certain level or when to automatically open the drain.

Further some of the units disclosed here are portable while in U.S. Pat. No. 6,727,091 they surely are not: "The unit 20 is intended to be mounted on a wall of the room in which the air is to be cleaned." (Page 6, lines 65-66). The considerations required to effectively implement a portable system are somewhat different than those for a permanent system.

U.S. Pat. No. 5,430,972 shows a plant growing apparatus which uses a lamp and plant and "soilless" soil to clean air. The overhead lamp with a post and hood uses a light, preferably a florescent light, so that a minimum amount of light is automatically or at least easily available (page 1, line 45). Light for the plant is provided by a lighting source preferably in the form of a florescent bulb (page 3, line 3-5). The light is supported by rods and the length of the rods may be adjusted as the plant grows in height (page 7, lines 1-3). The light is mounted in a hood. And, an integral annular inclined sidewall serves as a light shade (page 5 line 65). The lower shade need not be used (page 6, line 30). The unit does not have an induction fan but uses the heat of the light to draw air upwards. Specifically on page 4 line 65 onward it says "The evaporation of moisture from the top of the growing medium, the heat of the lamp and the nature of the growing medium cause air and moisture to rise through the growing medium and to be exhausted into the room." In U.S. Pat. No. 5,430,972 as in U.S. Pat. No. 5,433,923, heat from the lamp is being utilized to cause the air to rise. The present disclosure uses a mechanical air moving device. In U.S. Pat. No. 5,433,923, an induction fan is used and heat is used to kill off micro organisms. The present disclosure uses a cool lamp which is far more efficient and which saves markedly on energy and which is much more "plant friendly." In U.S. Pat. No. 5,430, 972, "[w]ater from the wet chamber is wicked upwards" (page 4, line 22). Claim 1 of U.S. Pat. No. 5,430,972 recites one of its elements being "a removable receptacle for holding the soilless medium and having a mesh bottom through which roots may grow into the wet chamber to obtain moisture and a dry compartment into which other roots are exposed to air." The present disclosure does not utilize a wet and dry chamber. Moisture is obtained through the micro irrigation system which flows down through gravity through the filter bed in which the plant and its roots are situated or in one embodiment has a micro irrigation system of irrigation and a wicking up from water within the plant pot. In this patent the preferred and illustrated bottle 18 provides enough moisture for one week for most plants (page 5, lines 14-15). Preferably, a light timer 66 is connected to an electric cord 68 for the light assembly and is set to control the duration and the time at which the bulb 25 is lighted (page 5, lines 16-19).

U.S. 2005/0186108 discloses a bio-air sterilization system using UV light. Deactivation may be dependent on a pre-scheduled time by use of an optional timer or an alternate method may be used (page 5, paragraph 51). It also has a motion sensor to shut off the (second) UV light. This publication is not for a plant air purifier.

U.S. Pat. No. 6,000,559 discloses a manner of mounting a circuit board in a confined space and in particular in a portable air purifier unit. However, no mention has been made of what functions the circuit board is designed to control or what devices are attached to the circuit board.

U.S. Pat. No. 6,616,736, in the abstract, appears to disclose a portable air purifier where an air purifier (10) is provided having a housing (11), having a grilled air inlet (12), a grilled air outlet (13) and a controlled panel (14). The air purifier (10) also includes a pre filter (16), a main filter (17), a blower (18) and a controller (19) all mounted within the housing (11). The controller (19) has a central processing unit having a permanent memory for storing the program instructions for operations and control of the air purifier, a working memory, and a non-volatile memory for the permanent storage of programs and counters. Additionally, the program may include multiple days so that different days have different scheduled programs or different groupings of days such as the same set of programs for Monday through Friday and a different set of programs for Saturdays and Sundays. (Page 2 lines 65-67 and Page 3, lines 1-2) This disclosure includes a controller, key pad and programmable processing unit for an air purifier which performs a range of different, but coordinated functions.

There appears to be no prior art where a photometer was used to activate a grow lamp and surely not a grow lamp mounted on a plant air purifier. No prior art is apparent in which a control system of any sophistication is utilized in a plant air purifier.

SUMMARY OF THE INVENTION

A plant air purifier with a control system (e.g., printed circuit board assembly), a photometer, a micro irrigation system, an insertable grow pot so growers can grow plants within that pot and simply insert it into the unit. In addition the invention has a LED accessory grow lamp, a warning signal, and automatic fan shut off if water in the reservoir gets too low. The unit has a long term reservoir. It can run on DC current. It has a backup battery and is programmable to allow the user to set the times of operation by the hour or by the day. The plant air purifier is portable in many embodiments. In other embodiments it is attached to the water feed within the structure and the structure's plumbing system.

In particular, in a preferred embodiment, this invention is a plant air purifier and associated method for purifying air, comprising: at least one grow container; a filter bed comprising a surface which is horizontal within 20 degrees of a horizontal plane; at least one plant which grows within the filter bed; a reservoir for containing water for watering the at least one plant; a mechanical watering device which waters the filter bed from the top down; a pump for pumping water from the reservoir to and through the mechanical watering device; and an air propulsion mechanism for propelling air through the filter bed.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawings summarized below:

FIGS. 5A and 5B illustrate a top plan view of the an alternative embodiment of a plant air purifier.

FIG. 5C illustrates a snap in plastic unit to cover lifting holes.

FIG. 6A illustrates a top plan view showing canopy wire peg holes.

FIG. 6B illustrates a top plan view of canopy wires in place and canopy wire pegs inserted into canopy wire indentations.

DETAILED DESCRIPTION

Figure 1:
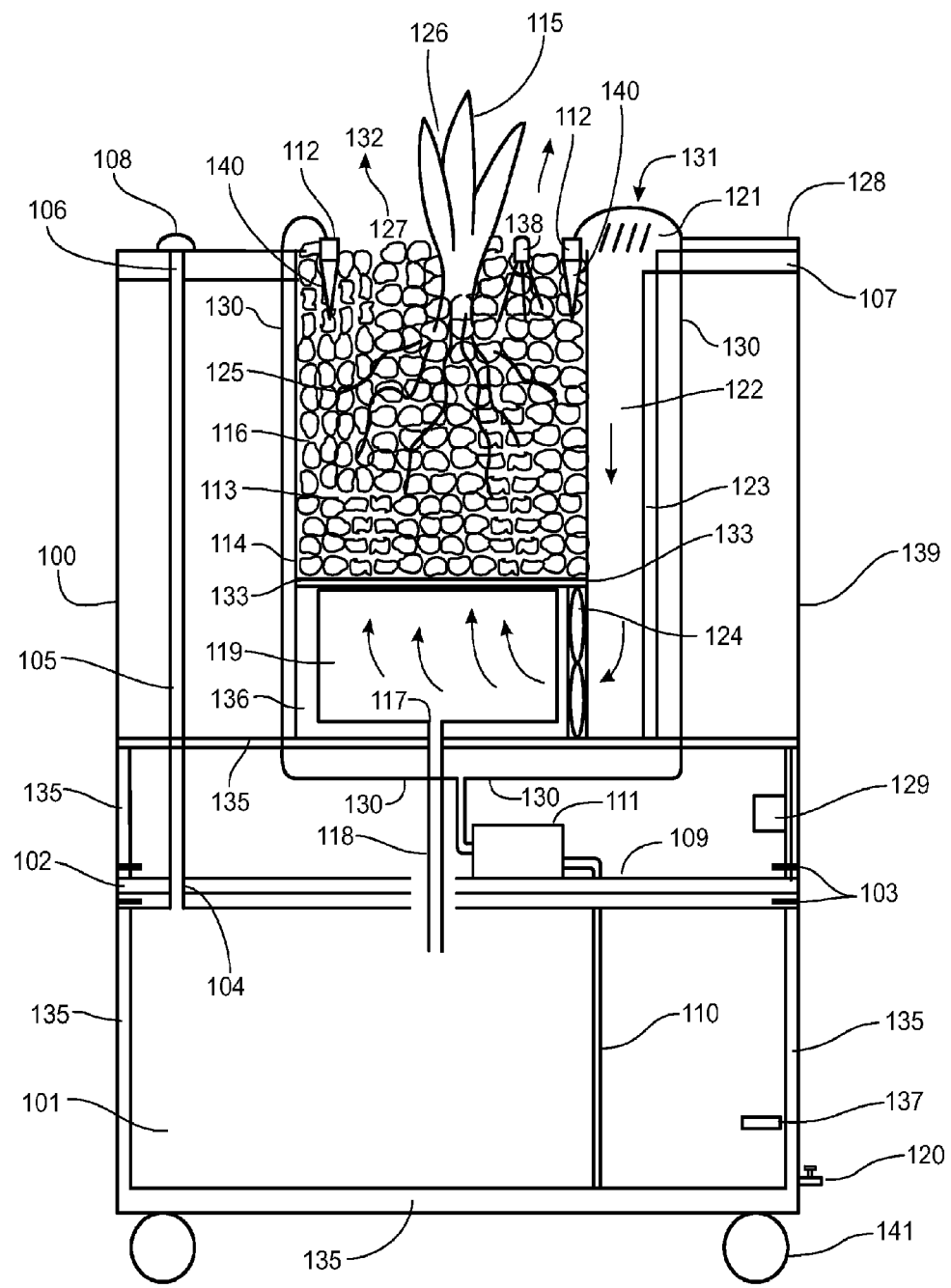
FIG. 1 shows in side plan view, a first preferred embodiment of a plant air purifier.

We shall now summarize several embodiments of the invention and then review the figures in more detail. Many of the details of the micro-irrigation system are already disclosed in the priority documents earlier incorporated by reference.

LED grow lights. White light products produce a lot more energy than plants can use. A typical white light product produces light wavelengths from 380 nm (UV) up to and beyond 880 nm (IR). Plants, on the other hand, primarily use light wavelengths from 400 nm (blue) to 700 nm (red). This range of light wavelengths has been labeled PAR or Photo synthetically Active Radiation. On average, nearly 82% of a traditional white light product's light energy is of little benefit to plant growth, and in most cases is harmful to plant health. In a typical HID, HPS, or MH light bulb this harmful energy is in the form of intense heat (IR) and ultraviolet radiation (UV) that cannot be seen but can certainly be felt.

Plants cast off white light for the most part. This is why the leaves of most plants look green. Most of the white light is reflected by the plant and not absorbed.

LEDS lights (light emitting diodes) are the best remedy to handle lightning, particularly for plants in a plant air purifier. They save 80% to 90% in energy consumption compared to fluorescent tubes, HPS or MHS. 95% lights of LEDs can be absorbed by plants, but only 10% by HPS or MHS. They reduce grow room temperature, which is very important. High power LEDs are estimated to last 50,000 hours. This equates to an expected bulb life of 10-12 years of 24/7 operation. They need nearly no maintenance. They also can provide wide angle projection which ensures uniform leaf coverage.

With LEDs, the reflector is built right into the LEDs themselves, so no secondary reflector is needed and almost all of the light generated by the LEDs is directed straight at the plant. In fact they are so effective that NASA is using them in space right now with great success. LED lights produce very little heat. This means one can safely forgo energy-consuming fans and other exotic cooling solutions to prevent leaf burn.

LEDs typically require less than twenty volts at the bulb which greatly reduces the risk of fire or injury, especially in wet growing environments. In contrast, the high heat generated by a typical metal halide or high pressure sodium lamp is more than enough to ignite nearby combustible objects such as paper or cloth. In fact their reflectors often get very hot as well and can cause severe burns if they are accidentally touched. LED Grow Lights operate at just a few degrees above room temperature in fact their operating temperature is less than fifteen degrees above ambient temperature. Just slightly warm to the touch while running, LED Grow Lights are safer to use around children and pets, opening the door for classroom plant air purifiers. Further benefits are as follows:

Light Weight—LED Grow Lights have no bulky reflector or heavy ballast, and weigh only a few ounces. The ballast of a standard metallic vapor lamp, on the other hand, can weigh up to fifty pounds requiring special consideration.

Less Fragile—The glass bulbs of other plant lighting is very fragile. LED plant lighting has no glass parts, and are much harder to break.

Less Environmental Hazard—Metallic vapor and fluorescent lamps all contain mercury, a heavy metal identified by the U.S. Government as hazardous to the environment and our landfills. LED plant lighting contains no mercury and represent an environmentally friendly lighting choice.

Less Glare—LED plant lighting delivers light that is very bright to plants, but relatively dim to people, thus eliminating glare.

Lower Chance of Heat Induced Root Damage—Plant roots don't like to be hot, and potted plants left under a non LEDs light grow lamp are prone to root damage where the light heats the surface of the pot. This danger is accentuated in a plant air purifier because of the forced circulation of air through the soil. LED grow lights operates at such a low temperature that incidental root damage is unlikely.

Less Watering—Using LED grow light, a plants will transpire less, letting one extend the time between watering cycles. This means plants unattended for a few days will have a better chance of surviving if their grow lights aren't drying them out.

Small and Light—Small and light weight, a LED light can be positioned any way one prefers, ensuring all parts of the plants get the maximum light they need.

The grow lamp in a preferred embodiment comprises a LEDs grow lamp and because LEDs can be set to operate at a particular wavelength frequency they can be set to operate at just the right frequency for the plants to grow or spread out, so increasing their beauty. Because the plants within the plant air purifier are for the most part plants requiring low light, having grown up in the tropical rainforest where little light is found, the intensity of light that they need is minimal, usually about 100 to 150 light candles, which is about one-one hundredth of the light coming from direct sunlight obtained when the sun is directly overhead in the summer time. Most plants within a plant air purifier prefer indirect sunlight and so LED lighting is ideal.

The grow lamp itself is either situated in the platform itself, in the console of the unit, or is attached from the rear where it has an extending arm so as to provide overhead lighting. The grow lamp itself may not be necessary if the plant air purifier is placed where there is more than adequate ambient light (including natural light), and even overhead lighting found within a structure may well meet the plant's requirements. But in inside offices, or in motel rooms where the heavy drapes are drawn for days at a time, light is required and so the plant air purifier of the present invention has a grow light accessory. Because the grow lamp is connected with the printed circuit board assembly which has a micro processor and timers and because a light sensor (e.g., photometer) is a part of the plant air purifier itself, the grow lamp can automatically go on and off at certain hours of the day and/or if adequate light is not available. This assures the plant has adequate light. As mentioned previously, LEDs, which are preferred, are very long lasting, consume little energy, and do not heat to a high temperature. In fact LEDs do not usually reach a temperature above 90 degrees and so they will not burn the leaves of the plant themselves, which allows them to be placed quite close to the plant—within 1 or 2 or 3 or 4 or 5 or 6 inches.

Grow pot or grow tray in which professional growers can grow plants for the unit. The grow pot in which the plant and the filter bed are situated is an integral part of the plant air purifier. But because the growing medium used in the plant air purifier requires an artificial soil which is much more porous than normal soil and because commercial growers in the United States for the most part do not grow or ship plants in an artificial soil with great porosity, present-day sellers of plant air purifiers or the users themselves have to transplant plants from normal soil into the grow pot or grow trays used in the plant air purifier. This is a time-consuming process and one most users of plant air purifiers do not want to deal with. In addition, plants, when they are transplanted, go through a period of shock which inevitably results in a statistically significant percentage of plants being killed. To eliminate this the plant air purifier should utilize and readily mate with a grow pot or tray which commercial growers can actually use to grow plants used in the plant air purifier, and the plants should be shipped in such a pot. Thus if a plant were to die when a user is using the plant air purifier, he or she would not have to transplant another plant on their own but would be able to simply purchase such a plant and tray which they can just modularly insert into the unit. This invention makes use of an already existing grower's plant pot or tray wherein certain novel and nonobvious modifications of that plant pot allow it to function in the new version of the plant air purifier. In other cases the manufacturer will supply certain plant trays used in other models to the growers who will grow plants in these trays specifically to be used in those models of the plant air purifier. By having certain stores which handle plants and pots, they will have a ready source of dealers who can sell the product and also sell replacement plants and parts for the units which might wear out.

Easy do it yourself replacement of parts. The present invention has a number of different mechanical parts. These parts may eventually break down. It is important to design the units so that replacement parts can easily be substituted for the original when a breakdown occurs and the purchaser of the unit should be able to replace the one part with another on his or her own, thus eliminating the need to send the unit back to the manufacturer or bring it to a repair center. With service calls running as much as $60 an hour, the object is eliminate the need for the user to have to send out the unit if a malfunction occurs. Thus the vast majority of parts which could or might break down should be readily purchasable at the store the product was first purchased, or over the internet, and users should easily be able to substitute one component for the one that has broken down. Since most of these devices can easily be obtained and since the attachment to the printed circuit board assembly will be with a pin attachment, the user will be able to be his or her own repair person, if that is his or her choice.

DC current used wherever possible. This invention uses DC current where ever possible. Why? Because the various components used can be operated with less energy and because it is less dangerous. This is especially important when water is involved. The unit itself has water being sprayed via emitters or by means of a moisture collar placed on the surface of the filter bed or just above. Water helps to conduct a current far better than many other substances. Normal house current if one utilizes alternating current in the United States is set at 110-120 volts. DC current needed to run the various components is at 6 volts, 12 volts or 24 volts, and can often be supplied by batteries. So the operating savings will be dramatic and the chance of being electrocuted much less likely. Because when low level DC current is used UL testing is not often mandatory, this can reduce costs, making the product more competitive.

Light meters, photometers and photodetectors. For the purposes of this disclosure, we are using the terms "light meters," "photometers" and "photodetectors" interchangeably. Earlier it was noted how a light sensor, e.g., photometer may be utilized in conjunction with the alarm whether the alarm should an audible alarm when water levels becomes low in the long term reservoir. In that case the photometer determines whether it is night or day. Thus, there is a sequence of conditions to determine whether the grow lamp should go on or stay off depending on whether there is enough light in the room when the plant within the purifier is to receive light. If, for instance, the plant air purifier is placed within a room which might be in, say, an inner office, and there is no light on and the plant would normally receive light, then the photometer determines the level of light in the room and if it is not enough for the plant than the grow lamp goes on.

Interrelation of parts with a control system. Having a control system, e.g., printed circuit board assembly (PCBA) in many products is not unusual. But plant air purifiers have not made use of such a helpful device. By not doing so, the consumer and commercial markets for these devices has been severely limited, as noted earlier. Since plant air purifiers have a number of specific needs which are not of concern for a regular plant, and since a coordination of different components and functions within the overall unit are essential, a PCBA is a very compact inexpensive way to help make the unit more user friendly and so take care of much of the drudgery that would otherwise be the case. Plus it can alert the user to conditions which demand immediate attention and can safeguard the purification system itself. Were the air propulsion mechanism to continue to function when water was low in the reservoir, for example, the plant within the unit would be killed in short order. By using a PCBA, a sensor within the reservoir can send a signal to components within the PCBA and the air moving mechanism can be disabled until water in the reservoir is refilled. This is just one of many functions which the PCBA makes easier to accomplish. Especially in a portable plant air purifier where space is important. A PCBA is one of the most effective ways to save on space and to connect various components of the unit itself. Plus they can work together much more effectively.

A large, automated reservoir that doesn't need a refill for at least a week. Plant air purifiers require far more water than would any normal plant. Their soil is far more porous. Vast quantities of air pass through that soil and absorb moisture from the filter bed itself. A portable plant air purifier often uses up to one or two quarts of water a day, while a built in plant air purifier system can use far more. The amount of water needed for a plant air purifier is far greater than the average plant or body of plants placed in the same space and people simply do not want to be spending every day replenishing the water supply of a plant air purifier, manually, on a daily basis. In the event that an owner or retailer of plant air purifiers has more than one unit, the time necessary to attend to the daily watering needs of his plant air purifiers can spell the difference between selling the product or not. And, if the plant air purifier continues to run when it is low on water, it will kill the plant in a matter of hours. For all of the above reasons, a large reservoir is necessary so as to free the user of the device from unwanted and tedious labor. This invention has a reservoir large enough to supply the unit with at least a week's worth of water. Assuming that the unit were to run 24/7 and assuming that it used two quarts of water a day, a week's supply of water would need a minimum of 3½ gallons. This invention has a reservoir of that size and in some cases larger.

Other features. Because of the weight of the planter when fully operational, with the water reservoir and the filter bed, plant and mechanical mechanism, the planter will need casters or wheels, or to be on a device with casters or wheels. Additionally, an optional locking device may be helpful so the portable plant air purifier does not move. Water weighs around 8.345 lbs per gallon. Therefore 5 gallons would weigh about 41.725 lbs. The plant material even in the smaller units would weigh at least 10 lbs. For ease of cleaning of the area around the unit, casters or some other mechanism are added for moving the present invention. Plus there are other features which are shown in the figures themselves.

All of the foregoing will now be described in more detail with reference to the various drawings:

FIG. 1 shows a first preferred embodiment of the plant air purifier 100. In this front side cross-sectional view we see that there is a reservoir 101. The reservoir is part of a container 139. The reservoir is formed by two interior ridges 103 in a lower part of the container. A reservoir lid 102 is snapped in between the two interior ridges 103 in the lid of the housing. The lid itself has an opening 104 for a conduit 105 which leads to a water reservoir refill opening 106 in a box 107 which has a cap 108 over the opening shown on the top left hand side of FIG. 1. There are two more openings in the lid 102: one an opening 109 for a water feed 110 which leads to a pump 111 which pumps water from the reservoir 101 to sprinklers 112 mounted on stakes 140. For illustration, not limitation, two sprinklers 112 are shown. The sprinklers 112 are attached to sprinkler water feeds 130. The sprinklers saturate the filter bed 113 in the growth pot 114 where a plant 115 and microbes 116 grow, and there is an inner cavity opening 117 for a return drain 118 from the hollow chamber 119 below the growth pot 114 where excess water falls to where it then goes down a drain 118 situated at the bottom of the hollow chamber, and then returns back into the reservoir 101 for reuse. In this figure the reservoir utilizes part of the watertight container for storing water but it just as easily could have utilized a drop in reservoir which would have simply resided in the bottom of the outer housing itself. At the bottom or close to the bottom of the reservoir is a petcock 120 which allows the reservoir to be drained. However, a siphon tube could be dropped down the water refill pipe 105 and water could be siphoned out of the reservoir in that manner as well. When water gets too low in the reservoir a water level sensor or moisture sensor 137 sends a signal to the control system, e.g., printed circuit board.

Looking now at the top of FIG. 1, one can see how the unit is able to purify the air. Poor indoor quality air is pulled in from the top of the unit on the right side though vents 121 and an opening. It is understood that this air intake opening could be placed elsewhere on the unit itself whether on the side or even from the bottom if the overall unit were slightly raised by means of feet or casters. In this illustration air enters through vents which pull the air in from the top right side. The air passes down an air intake channel 122 where there is a UV light 123 which kills a good portion of the living contaminants found in the air. The impure air 131 is pulled in by means of an air movement mechanical device 124, in this case an induction fan. The induction fan can be situated close to the top of the unit or down almost at the bottom of the channel which leads to the hollow chamber 119 just below the growth pot 114. The air exits by passing through the filter bed 113, passing by the roots 125 of the plant and passing by the leaves 126 of the plant itself where it picks up whatever plant volatiles and other negative ions 127 are generated by the plant itself, leaving the user with purified air 132. While the air could as easily be pulled down through the filter bed and then exhausted out past the UV light, that would result in the plant volatiles being pulled down through the filter bed as well which might limit effectiveness. The filter bed is contained within a removable growth pot 114 which has a bottom which easily allows air to pass between the pot and the hollow chamber below it as well to allow excess water within the growth pot to drop down into the hollow chamber below it, see 211 in FIG. 2. The growth pot rests in a hole in the box 107 which fits snugly in the top of the outer container. The grow pot or grow container 114 rests on a skeletal frame 136 and helps to support the grow container and its contents. There is an additional skeletal frame 135 which supports other components placed in the outer container. The box also holds a control panel 128 which, for example, sets when the sprinklers 112 should go on and off, how many hours each day of the week the air purifier 100 should operate and from what time to what time each day it will perform, and other control parameters to be elaborated in more detail below. Box 107 holds a hollow chamber 119 below the removable growth pot 114, and the fan 124 or fans which pull the air into the system as well as the UV light 123 and the air induction channel 122. The control panel 128 is attached to a computerized control system 129, e.g., a printed circuit board assembly also known as a PCBA, though some people refer to it simply as a PCB, with timers which regulate how often the emitters 112 go on and connect the operating mechanism of the unit. 130 is the sprinkler water feed which is a tube or tubes connecting the sprinkler, a type of emitter, to the water pump 111 which is activated when the filter bed moisture sensor 138 indicates moisture levels within the filter bed are too low. Because of the weight of the unit when filled casters 141 for rolling or moving the invention are employed. Of course any other mechanism which would help it to slide rather than roll are included.

Figure 2:
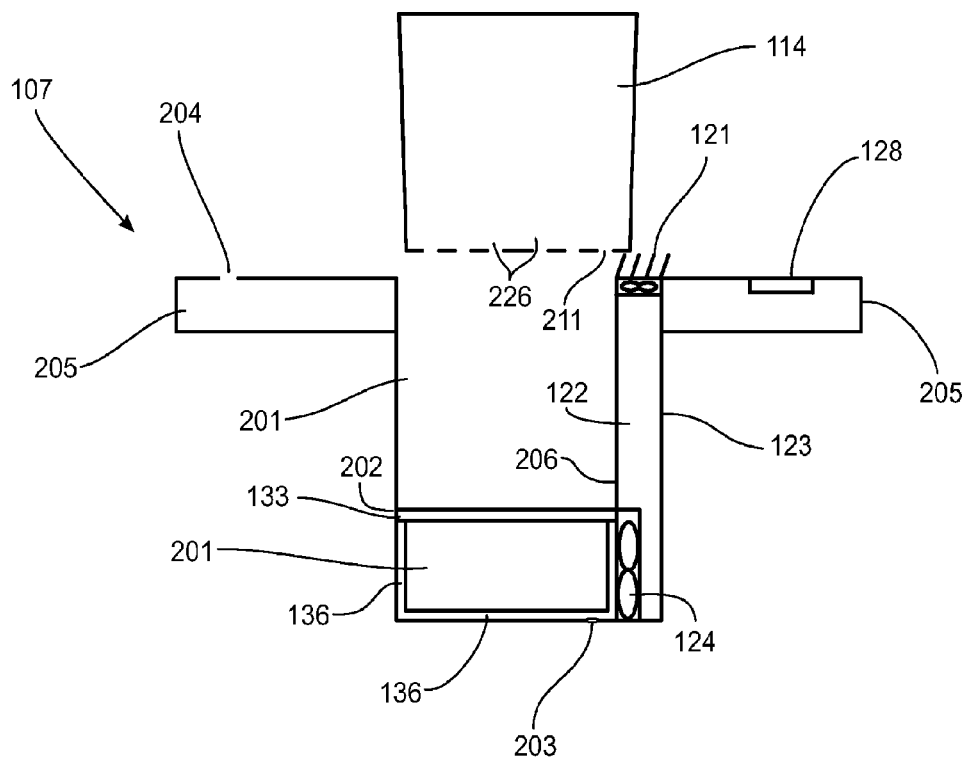
FIG. 2 illustrates a side plan view of a box which fits into an outer housing of the plant air purifier.

FIG. 2 is a side plan view of the box 107 which fits into the outer housing of the plant air purifier. Here it is easier to see the components of box 107. In the center there is a hollow cavity 201 into which fits the growth pot 114 with tiny holes 211 in its bottom. The growth pot only drops a predetermined depth into this cavity where it rests on a ledge or rim 202. The chamber itself is deeper than the growth pot and so there is an empty space 119 below where the growth pot rests, see FIG. 1. By the side of the inner cavity 201 of the box is the air intake channel 122 wherein is situated UV light 123. Above the air intake channel is a vent(s) 121. A fan or blower 124 is situated so as to draw air in through the air intake vent 121 or propel air out of this channel. On the top of the box is the control panel 128. At the bottom of the inner cavity 201 of the box is a drain hole 203 through which water returns to the reservoir 101 of FIG. 1. On the left side of this figure is a hole 204 for the water refill pipe 105 shown in FIG. 1 which allows the user to refill the reservoir. Around the outer cavity is a lip 205. The lip makes contact with the lid of the outer housing as shown in FIG. 1 or can fit over the upper edge of the outer housing itself.

The grow pot and hollow cavity. One variation within the inner box is to have the grow pot fit down into the inner cavity only to a predetermined depth, as shown in FIG. 1. This leaves a hollow cavity below the grow pot wherein the air rushes in through the induction chamber 122 passes the induction fan 124 and then moves into the hollow cavity 119 and up through the porous openings (drainage holes) 226 in the grow pot 114. But as mentioned previously this will require a support 136 within the hollow inner cavity as the pot, soil, moisture and grow pot may weigh as much as 20 pounds.

Figure 2A:
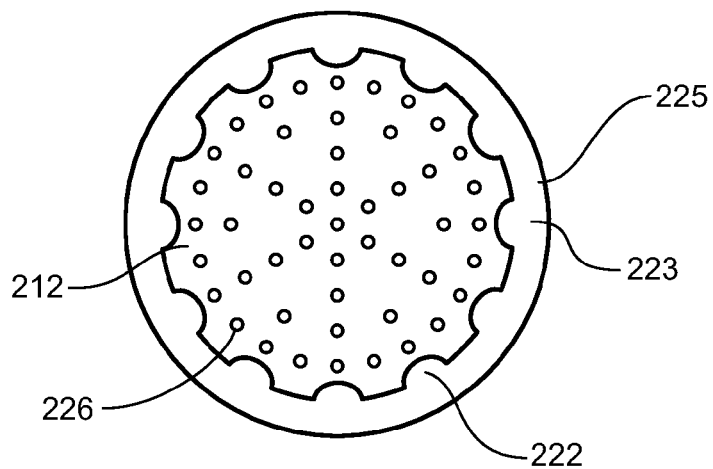
FIGS. 2A, 2B and 2C illustrate a preferred embodiment of a grow pot.
Figure 2B:
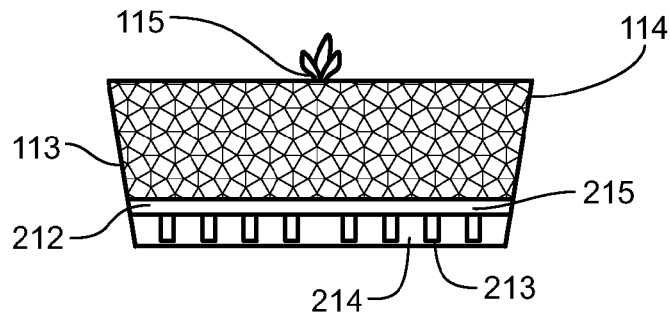
Figure 2C:
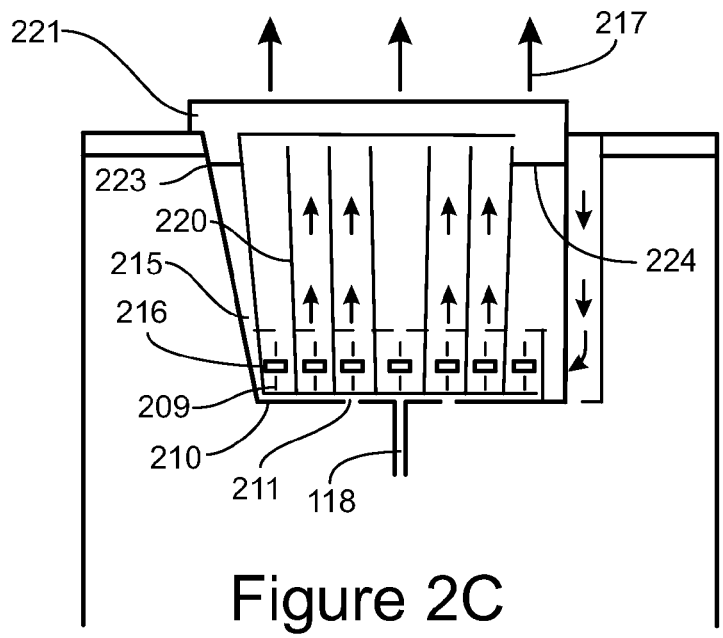

The preferred embodiment of the grow pot is shown in FIGS. 2A, 2B & 2C. Here we have a grow pot 114 deeper than in FIG. 1 so that the grow pot's bottom 209 actually slip down and makes contact with the bottom 210 of the hollow cavity in FIG. 2C. The grow pot has drainage holes in its bottom 211. A plastic insertion grid 212 is placed inside the grow pot with stilt like supports 213 so as to create a hollow chamber 214 in the bottom of the grow pot below where the filter bed 113 and plant 115 rest on the top of the grid 215. The grow pot has air slits or air holes 216 cut into the grow pot's sides below the top surface of the grid. Impure air is pulled down into the bottom of the grow pot through the air vents in its sides. Then it passes up from below the grid, through the filter bed and out. It can of course move in an opposite direction through the filter bed first, than exit through what previously was described as the entrance chamber but now becomes the exhaust chamber 122, and out the vent 121 passing by the UV light 123. The originally-described air flow direction 217 is designated by the arrows in 2C.

In the preferred embodiment of the grow pot the pot itself is corrugated 220 so as to give added strength and thus allow it to be made out of a thinner material, thereby increasing porosity and thus airflow if a semi-permeable fibrous material is used. Meanwhile there is a lip 223 which extends out beyond the corrugation and then the pot continues upward approximately one inch higher, by the pot burgeoning out and providing an airtight seal 224 which is created between the inner diameter of the inner cavity of the box, and the grow pot, as shown in FIG. 2C. This assures that all air moved by the induction fan will enter the grow pot and pass through the filter bed therein, rather than pass through gaps between box and grow pot. Because of the weight of the moisture laden filter bed material and of the plant within the grow pot and because of the tapered inner cavity, this is a preferred method of creating an airtight seal, rather than have a seal on top as shown in FIG. 5B.

The grow pot also has a top extension 221 above the box top surface so that one can grab the grow pot with thumb and figures and lift it out of the inner cavity in the box or place it into the inner cavity with relative ease. In that way there is no need for handles to be made on the grow pots or for holes to be made in the grow pot itself wherein removable handles would be inserted. Once the grow pot is removed from the inner cavity of the box there is now ample gripping space to hold onto the grow pot by simply placing one's finger's below the lip and around the sides of the upper part of the pot so that one can carry it for quite a distance if necessary. A pot of just such a nature as described is now produced by Nursery Supplies, Inc. and is called the Adapter model, except that the cut outs on that model's sides extend all the way up from the bottom to one inch from the top of the pot.

FIG. 2A shows a top down view of the grow pot with the grid 212 inserted therein. As one can see the grid conforms to the interior corrugations 222 of the plant pot. In FIG. 2A one can see the extension of the lip 223 which creates the air tight seal 224 when it is wedged firmly against the inner diameter of the inner cavity of the box. 225 is the point where the outer diameter of the grow pot and the inner diameter of the inner cavity of the box meet. Within the grow pot is placed the grid 212 which has holes 226 through which both air and water can pass.

Figure 3:
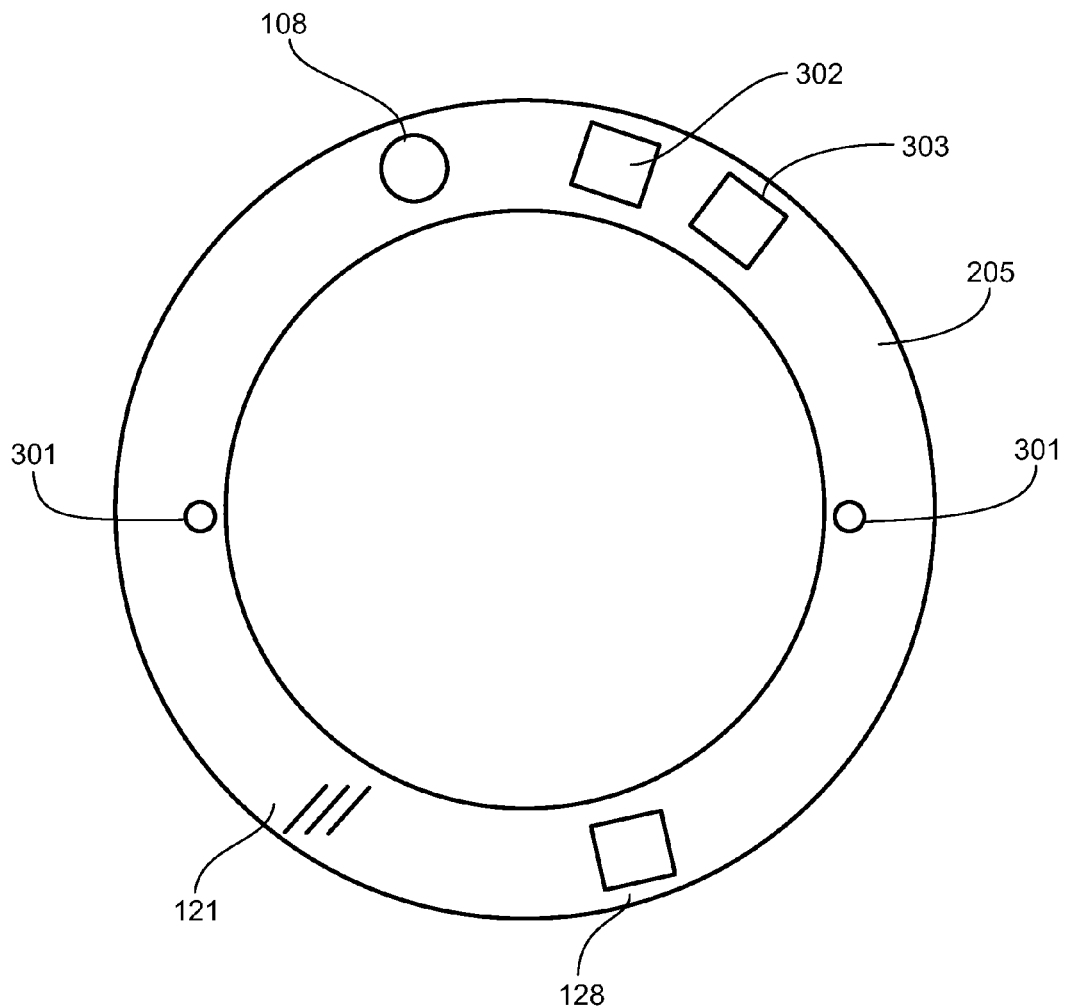
FIG. 3 illustrates a top plan view of the exterior of the box in FIGS. 1 and 2.

FIG. 3 illustrates a top view of the exterior of the box. Here we see the upper lip 205 of the box on which are situated the air intake vent 121, the control panel 128, the reservoir refill cap 108 and two stake holes 301 wherein the stakes which are attached to the sprinkler emitters rest when they are not driven into the filter bed of the plant pot itself. Also illustrated are visual display 302 and key pad 303.

Figure 4:
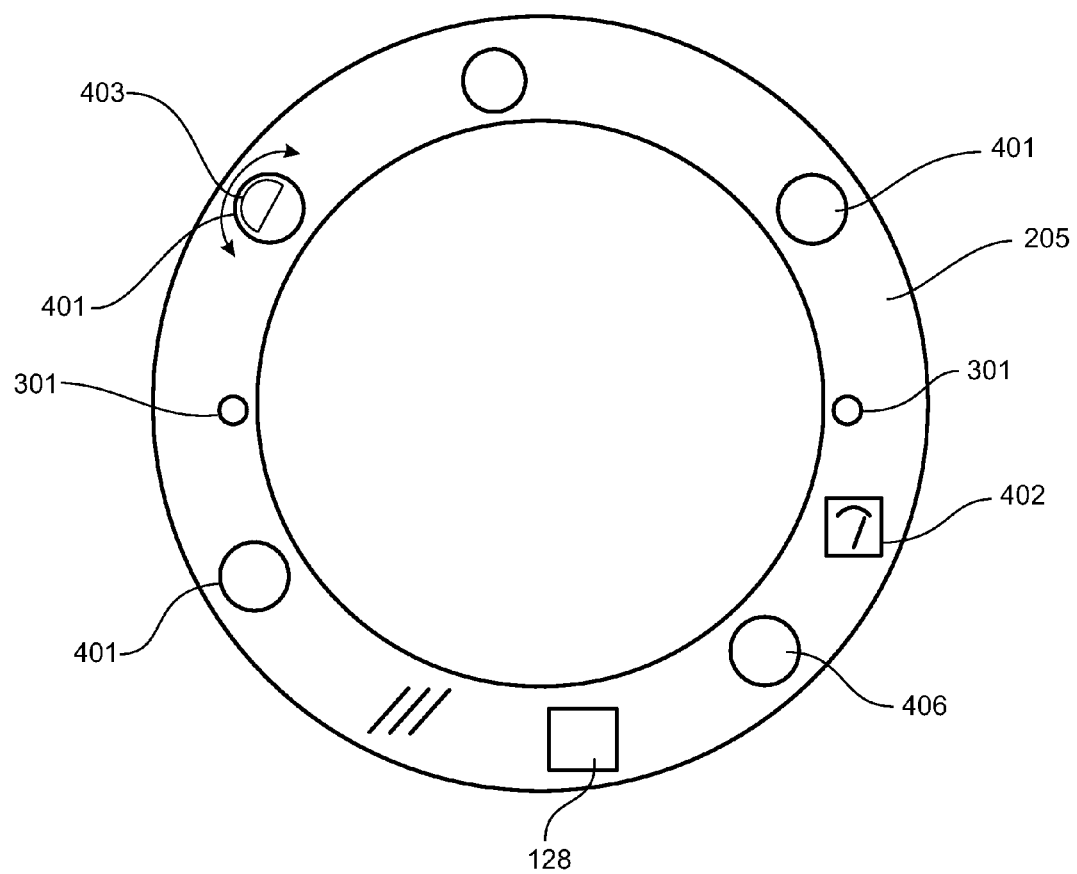
FIG. 4 illustrates a top plan view of the exterior of an alternative embodiment of the box.

FIG. 4 illustrates a top view of the exterior of the box, the same as in FIG. 3. However, on the upper lip of the box are placed lights 401 which shine up from below and bathe the plant and its foliage in a soft glow while at the same time providing the plant with the necessary light for growth and health. The bulbs themselves are LED grow bulbs and help the plants to thrive, being ideal for chlorophyll production. Plus they are better for the environment and save 50% to 90% on energy consumption compared to incandescent or florescent tubes. They have no ballast like other plant lights and emit less heat which results in better protection to the plant(s), while at the same time they do not emit infrared rays and ultraviolet radiation which is harmful to plants. These lights are or can be connected with control panel 128 and the computerized control system so they function so many hours a day and at a specific time or they can be attached to a small light meter 402 which measures the amount of light the plant has received within the past twenty four hours and makes up the difference automatically so as to meet the plant's minimum or optimum light requirements. This last feature is ideal when the plant air purifier is placed in a dark room where the curtains are drawn and kept closed, often for days at a time, so as to save on heat in the winter time in an unoccupied motel room in a northerly climate, or to prevent excessive and harsh sunlight from entering in more southerly climes so as to keep the room cooler in summer. The lights themselves may be equipped with hoods 403 and may swivel so as to shine growth light just where needed so as to allow for more even growth. Some of the lights stationed on the lip may be mood lights 406 and not growth lights if desired and may even be installed with different colored bulbs for a different effect.

Figure 4A:
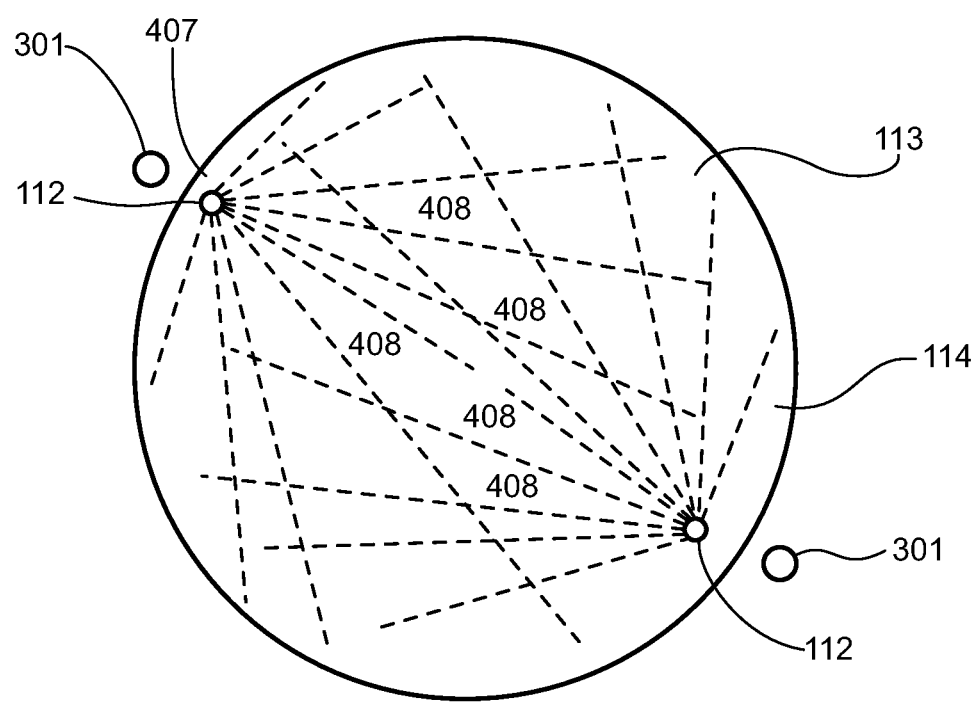
FIG. 4a illustrates a top view of a sprinkler configuration.

FIG. 4a illustrates a top view of the sprinklers 112 when the stakes are driven down into the filter bed 113 close to the lip edge 407 of the growth pot 114 and parallel with the stake holes 301 in the box. Emanating from the sprinklers 112 are the water flow paths 408 from the sprinklers themselves. Their trajectories overlap as can be easily seen. The sprinklers have a great many holes through which water is projected out and the two sprinklers will more than sufficiently cover and saturate the surface area of the filter bed with moisture. For the sake of this disclosure the terms sprinklers, sprayers and bubblers and other similar emitters are being used interchangeably.

FIGS. 5A & 5B illustrate another top view of the invention, showing the rim of the grow pot 501, the rim of the inner cavity of the box 502 and the upper face of the box. Indentations made in the upper face of the box 504 are placed in the upper face of that box so that an air sealing lid 508 with projections on its underside may snap into the upper face of the box and secure it. Holes within the grow pot 505 are used to insert prongs or lifting handles (not shown) so that the grow pot may be lifted out of the inner cavity. These must be covered over as well so air will not go through them rather than pass through the filter bed. They are covered over by the inner collar 510 of lid 508. Were a lid not placed over where it is so situated, air would travel up from 119, the empty space below where the grow pot is situated in the inner cavity of the box, and take the path of least resistance, namely the space between the inner diameter of the inner cavity and the outer circumference of the grow pot, and would move through this space rather than move through the filter bed of the growth pot 113.

FIG. 5C illustrates a snap in plastic unit 512 which could just cover the lifting holes 505. This snap in unit has two plugs 513 which fit into the holes themselves.

FIG. 6A illustrates a top down view specifically showing the canopy wire peg holes 601 which are just beyond the air lid 508. The air lid is placed over the upper lip of the box. Canopy wire peg holes are to be placed in the upper lip of the box and the pegs 603 placed within them will secure the canopy wires 602 on which the leaves and branches or vines of some of the plants growing within the plant pot would rest. Were such canopy wires not placed just over the filter bed, parts of growing plants within the plant pot might rest on the filter bed surface 113 and so obstruct the emitter water streams which came off the sprinklers 112 which saturate the filter bed 113 and provide it and the plants and microbes within the filter bed with necessary moisture. 130 is the water tube which leads to the sprinkler and 137 is where there is an indentation for the stake which holds the sprinkler when the sprinkler is removed from the filter bed.

FIG. 6B illustrates a top plan view with the canopy wires 602 in place and the canopy wire pegs 603 inserted into the canopy wire indentations 601 shown in FIG. 6A.

Figure 7:
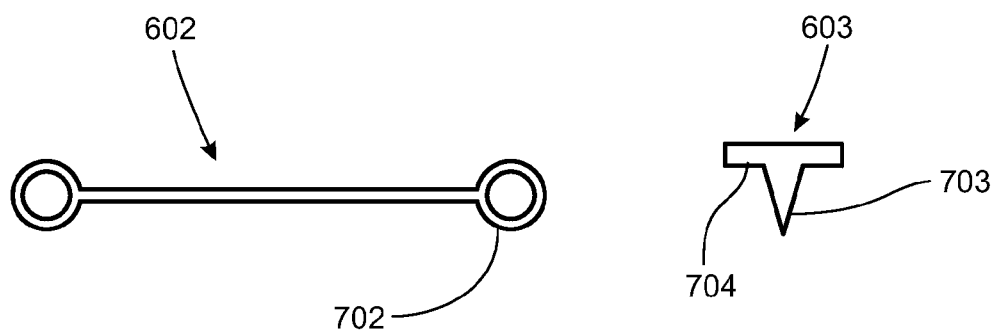
FIG. 7 illustrates canopy wires with a ring on either end through which canopy pegs are inserted.

FIG. 7 illustrates how the canopy wires 602 have a ring 702 on either end through which the canopy pegs 603 are inserted. The pegs have lips 704 that extend out from the main body of the peg so that the canopy wire rings will not easily slip over them and become loose. Plus they often have a sharp point 703 which adds to the ease of inserting them in the canopy wire indentations 601 of FIG. 6A.

Figure 8:
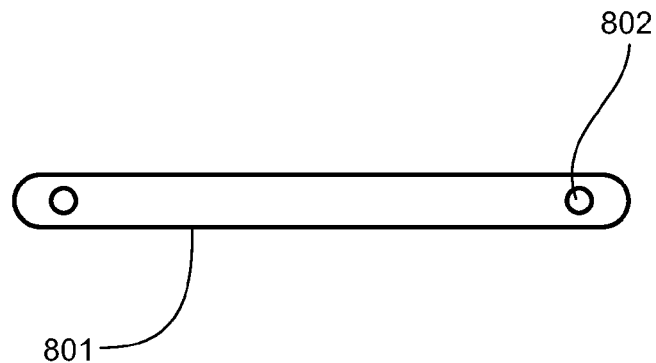
FIG. 8 illustrates an alternative embodiment of the canopy wires.

FIG. 8 illustrates another alternative for the canopy wires. Here is a simple plastic strip 801 with two holes 802 within it through which the pegs are inserted.

Figure 9A:
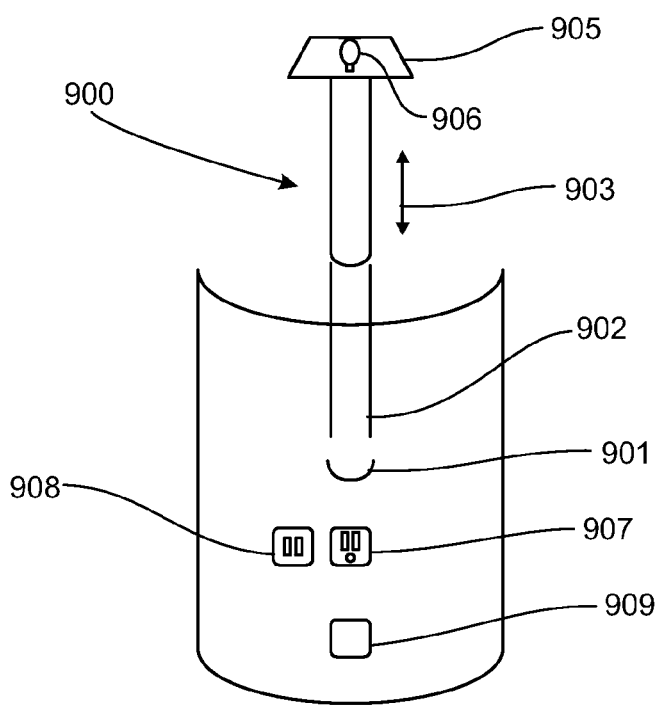
FIG. 9A illustrates a back view of an air planter and another way in which a LED grow lamp can be attached.

FIG. 9A illustrates a back view of the air planter and another way in which a LED grow lamp can be attached to the device. A nesting place for a grow lamp is molded into the rear side of the outer exterior of the housing 901. It does not have to be molded in, but can just be attached when and if a back grow lamp 900 is to be used. By having a detachable bracket which is used only when needed the rear exterior of the plant air purifier is not marred. This is especially important from an aesthetic point of view when the portable plant air purifier is placed in the center of a room where it can be viewed from all angles. Attached to this bracket or well insert is a grow lamp pole 902 which has a telescopic arm 903. The telescopic arm allows for the grow lamp to be raised or lowered to just the right height for the particular plant within the grow pot so that the plant receives the best exposure. The grow lamp may well have a hood 905 and a LEDs light 906 or a number of LEDs. A hood is, however, unnecessary when LED lighting is used.

From the back of the plant housing is a socket for the lamp to be attached to power 908, as well as another socket which gives power to the plant air purifier 907 from an outlet in the structure. The plant air purifier operates on low safe voltage of 12 volt current or 24 volt and so is both more energy efficient and safer. This also results in the unit not having to be UL tested and approved. There is also a battery backup 909 so that settings on the computer or relay will not be lost when the plug connecting the unit to current within the structure is lost. All inlets can be covered over with caps so that the appearance of the planter is not marred when any of these outlets is not needed or used.

Figure 9B:
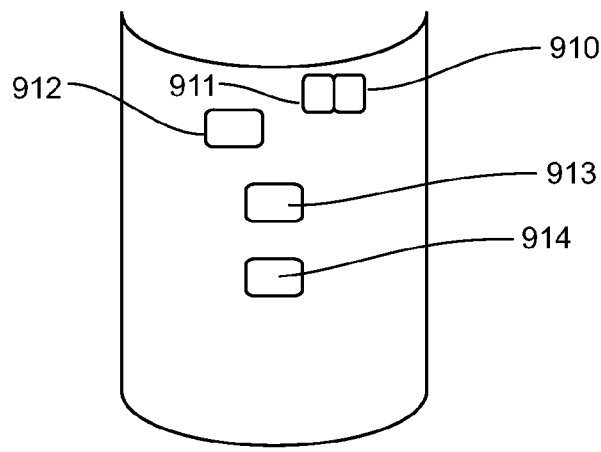
FIG. 9B illustrates a front view of the plant air purifier housing including a reservoir alarm light.

FIG. 9B illustrates a front view of the plant air purifier housing where is shown the reservoir alarm light 910 which activates when the level of water in the water reservoir drops below a certain point. This is activated by a moisture sensor located in the water reservoir or by a water level sensor 137 also located in the water reservoir. There is also an audible signal 911 (e.g., alarm buzzer) which also goes off when the water level in the reservoir falls below a certain point. This buzzer, however, will not go off as long as the photometer or light sensitive device shows that it is dark in the area in which the planter is located and/or as long as it is during a predetermined time period of the day (e.g., before a certain time in the morning set by the user). There is also a speaker(s) 912 which is attached to a sound module located on the circuit board assembly for the audible alarm, or a separate device not located on the printed circuit board assembly Also shown is a motion sensor 914 which can be used to turn off the induction fan if there is not sufficient movement in the room after a certain period of time. The motion sensor is also attached the printed circuit board assembly. By the same token if the induction fan is off and if water is not too low in the reservoir a signal from the motion sensor can activate the induction fan as well.

Figure 10:
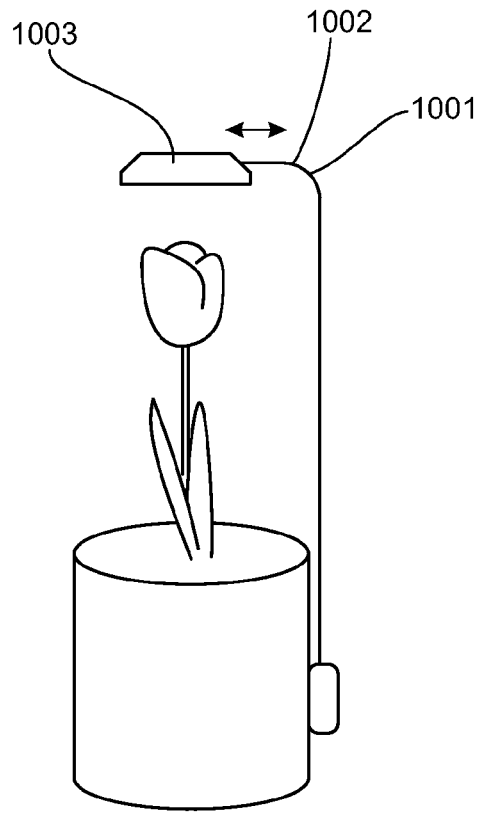
FIG. 10 illustrates how the lamp configuration can include a bend in the support arm.
Figure 10B:
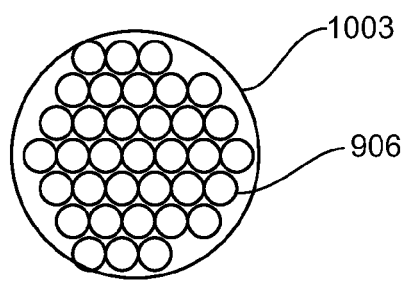
FIG. 10A illustrates an underside view of the grow lamp head.

FIG. 10 illustrates how the lamp can have a bend in the support arm 1001. This allows the upper part of the arm 1002 to be extended or contracted so that the lamp itself can be positioned just over the center of the plant and so light will bathe the plant evenly. Not having light from a lamp bathe a plant from directly overhead can cause the plant to lean in the direction from which the light is coming and so cause uneven growth. An overhead light is especially important when light is coming from only one source. By having light come from directly overhead the plant will grow straight and tall.

FIG. 10A illustrates a view from underneath the grow lamp head 1003. A plurality of light emitting diodes (LEDs) 906 are used as the illumination. These provide cooler light and a much longer life. Plus they take far less energy than ordinary light bulbs.

Figure 11:
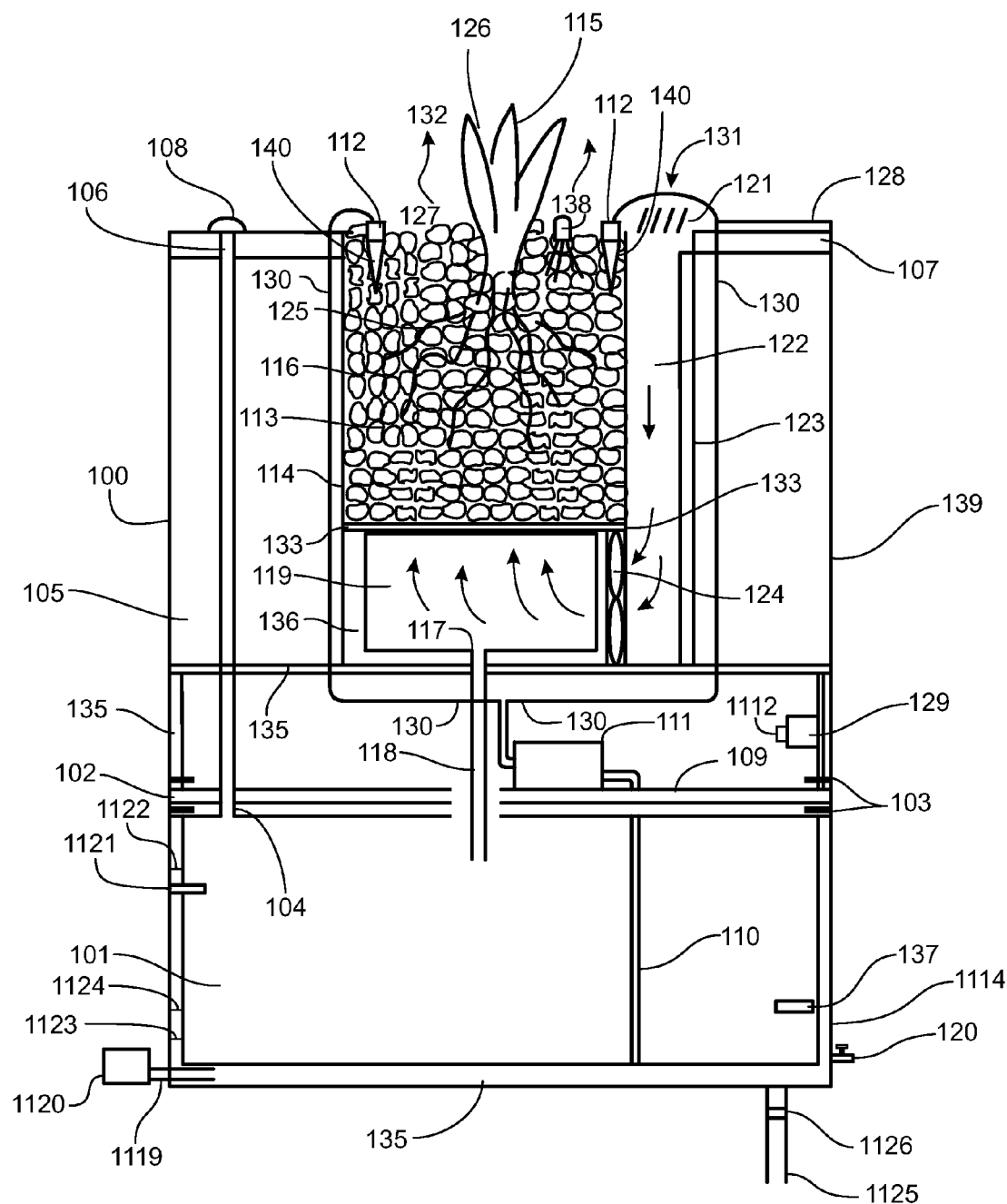
FIG. 11 is similar to FIG. 1, but with the capability of being attached to a water feed line in a habitable structure.

FIG. 11 is similar to FIG. 1, except that this unit has the capability of being attached to a water feed line 1119 from the structure itself much like a drinking fountain in a building. There is a float switch or sensor 1121 which shuts off the water entering the reservoir 101 when it is detected to reach a certain level in the reservoir 1122. There is a solenoid 1120 which turns on the water feed when water falls below a certain level 1123 in the reservoir as triggered by either a low level water float switch or low level moisture sensor 1124, and there is a drain 1125 into the building which allows for water in the reservoir to drain down into the sewer through the building's indoor plumbing. There is a drain solenoid valve 1126 which opens and allows water to drain out if water gets too high within the reservoir 1127 or if a person presses a drain switch on the control panel 128. As mentioned previously the sprinklers and induction fan are controlled by a computerized control system 129 (such as a printed circuit board assembly (PCBA) with a micro processor) and a timer 1112 which runs the induction fan and the sprinkler When the sprinklers are operating and while water is draining down through the filter bed the induction fan is turned off. This prevent excess water from being propelled into the air. When water runs low in the reservoir the induction fans are turned off, so that the rate of water usage diminishes and the plant and microbes are not endangered by a dried filter bed. Further, both a light 910 and buzzer 911 alert the user to the fact that the plant air purifier needs additional water. There is a control panel 128 with a keyboard 303 and visual display 302 where the user can set the times each day when the air purification system is to be operating.

Figure 12:
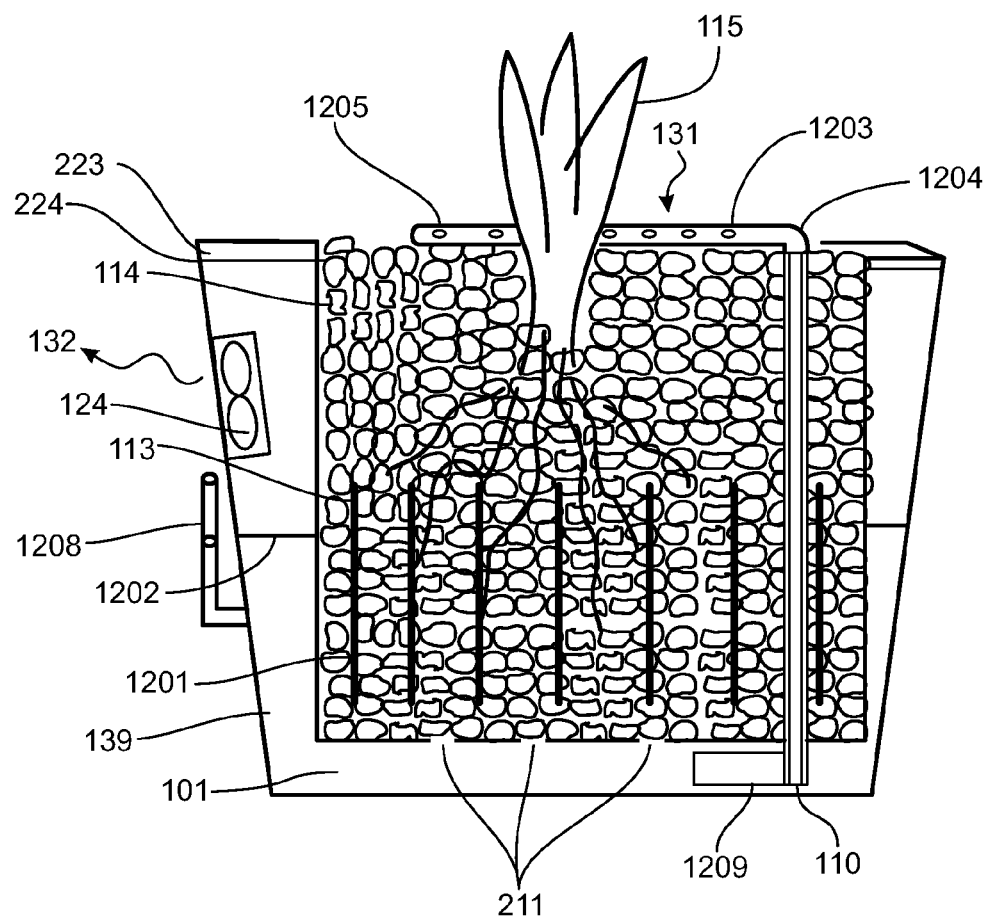
FIG. 12 illustrates another preferred embodiment of the plant air purifier.

FIG. 12 illustrates another embodiment of a plant air purifier. Illustrated here is a grow pot 114 supported within an outer container 139. The lower part of the outer container serves as a reservoir 101. Within the reservoir is a submersible pump 1209. Also partially submerged within the reservoir is the grow pot which has holes in the bottom 211 and air water slits 1201 along its sides. Both allow water to enter the grow pot if the water line 1202 is higher than where the holes or any part of the slits are located. If the water line is lower than either, then water can drain back into the reservoir through these very same openings were water to enter the grow pot from above. If the water line in the reservoir is lower than either the holes in the grow pot or any part of the air water slits in the side of the grow pot, than air can enter or exit through these same openings.

Within the grow pot is a filter bed 113 in which is grown a plant 115 and where microbes reside. When the water level in the reservoir is higher than where these holes or slits are located water having entered the grow pot through them will wick up through the filter bed and moisten the filter bed via capillary action.

The grow pot has a lip 223 which fits snugly against the upper edge of the outer container. This creates an air tight seal 224. Attached to the inside of the outer container 139 is an air propulsion mechanism 124 (e.g., fan) which either pushes air into the plant air purifier or draws it out. The air propulsion mechanism is placed well above the water level 1202 within the reservoir. Poor quality air 131 from outside the plant air purifier is either drawn down through the filter bed 113 and then pulled out of the air water slits 1201 in the grow pot above the water line 1202 where it is pulled out of the plant air purifier by the air movement mechanism 124 and exhausted out from the sides of the outer container as purified air 132, or vice versa, depending on whether the air propulsion mechanism is acting as a blower or an induction mechanism.

On the surface of the filter bed or just above it is a moisture ring 1203 which fits around the stem of the plant or plants which grow in the center of the filter bed. This ring may be little more than a length of tubing connected to a "T" 1204. The tubing of the moisture ring has perforations 1205 so that water from the reservoir, which enters the T via a water pipe 110 connected to the lower opening in the T can exit. This water pipe connected to the lower opening in the T extends down into the reservoir 101 from above.

In this embodiment of the invention, the water pipe extends down through the grow pot and into the reservoir itself where it connects to the submersible pump 1209. When the pump is operating water exits through the openings 1205 in the moisture ring 1203 and so bathes the filter bed 113 from above, where the moisture ring is located.

As long as the water level in the reservoir is above the holes in the bottom of the grow pot water will moisten the filter bed both from below and from above. Once water drops down in the reservoir to a point where it is below the holes in the bottom of the grow pot, water will only saturate the filter bed from above, and it will continue to be able to do so just so as long as there is any water in the reservoir. By controlling this upper level, one can determine whether the irrigation is top-down only, or is both top-down and bottom-up.

A water gauge 1208 extends out from either the side, front or back of the plant air purifier. This gauge may be a simple piece of clear or opaque L shaped plastic tubing. It extends out parallel to the base of the outer container and then extends upwards. Water from the reservoir enters the gauge and will rise to a level equal to the waterline within the reservoir. By looking at the gauge the operator of the plant air purifier will know when refilling of the reservoir becomes necessary. The water gauge can have lines drawn on it so that the operator of this device knows whether the filter bed is receiving moisture from both above and below or only from top down action. If water levels exceed the top of the water gauge water will flow out from the top of the gauge so as to alert the operator that he is putting in too much water and this safety valve will prevent damage to the air movement mechanism or any electrical connections. Failure to refill the reservoir when necessary will result in the death of the plant in short order for were the reservoir to run dry and were the air movement mechanism 124 to continue to run it would draw moisture from the filter bed and the roots of the plant if the humidity level of the air in the room in which the plant air purifier were placed was less than the moisture level in the filter bed itself.

This device is a basic model and has no bells or alarms to notify the operator when the reservoir is empty, nor does the air movement mechanism automatically shut off when water in the reservoir runs low. This model has no grow light, and no computerized control system, though all these things could be added if desired.

Water to fill the plant air purifier is poured directly through the filter bed in a top down direction in the way one would normally water a plant whereupon it drains through the filter bed into the reservoir below. The reservoir is large enough that it does not have to be refilled more than once a week were it to operate 24/7.

Because most plant air purifiers know in the art are bottom-up, it is important to briefly summarize why top-down micro-irrigation is desirable. Some of this is already disclosed in the priority documents referenced above.

If one uses top down irrigation, the excess water can pass out from the filter bed due to gravity. Then since there is no water stopping air flow from the bottom as there is for the vast majority of plant air purifier which rely on bottom-up wicking action, the air which is purified can move from the top of the filter bed, completely down through that bed, out the other end. But if there is water at the bottom then water cannot go down completely through the filter bed. It is as if there is a water wall at the bottom and the air has to go out the sides. This diminished the rate at which air can be purified. Meanwhile, the higher the opening in the sides, the less of the filter bed is being used for air purification. So if the filter bed is six inches deep and a foot square, then half a cubic foot of filter bed is being used. But, if water is going up 4 inches in the filter bed from the bottom and there are only two inches of filter bed with air and if the air holes in the side are one inch from the top, one is left with only one sixth of the filter bed being used for air purification. For, when the air goes down, it will only descend to the height of the air holes from the surface. But, with the use of top down irrigation, one uses the entire filter bed since the air comes in at the top across the whole surface of the filter bed and leaves the whole filter bed from the bottom of the filter bed equally. Then, as discussed at length in the priority document, the use of a micro irrigation system provides even saturation, maximizing microbial transport, to prove optimum system performance.

Figure 13:
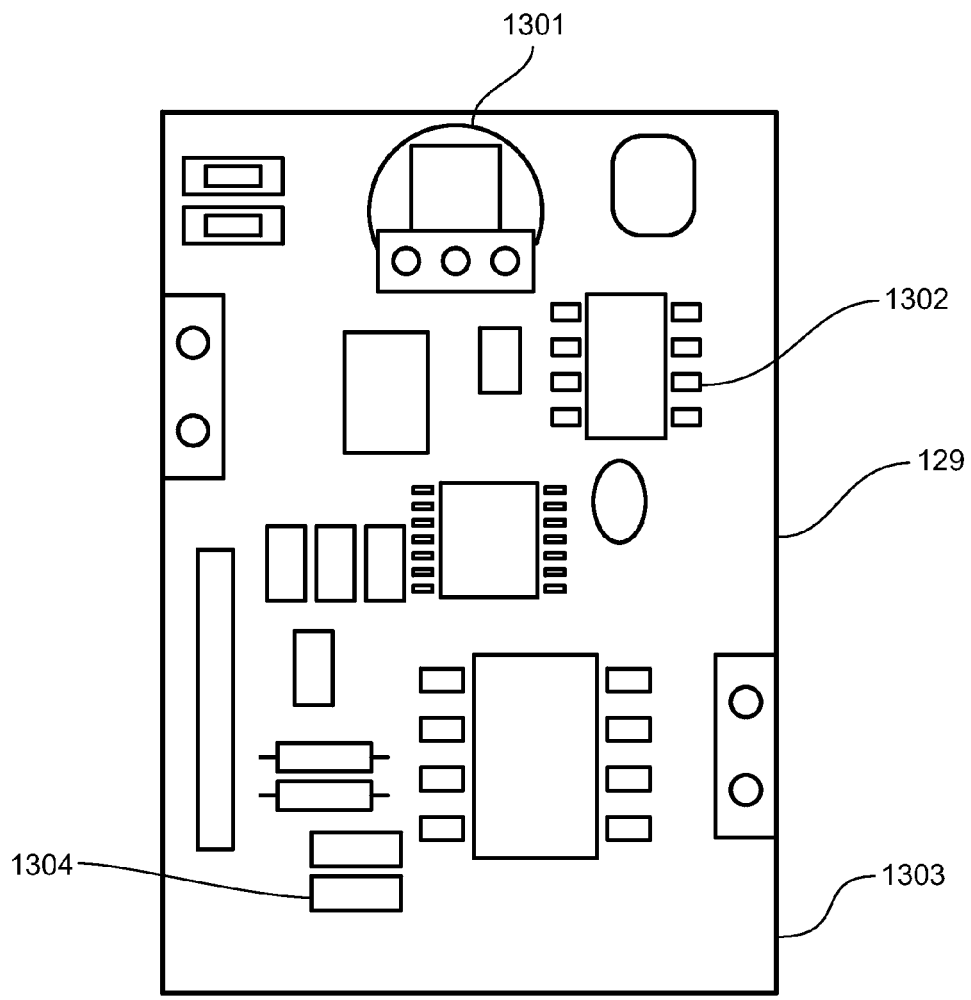
FIG. 13 illustrates a printed circuit board assembly, which is a preferred, but not limiting, embodiment for a control system.

FIG. 13 lustrates a printed circuit board assembly 129 with a micro processor chip, resistors, capacitors, relays, crystal oscillators, A to D convertors, a photometer diode 1301, and various input sensors. This circuit board is connected with the moisture sensor, the light meter, the LED grow lamp, the water pump and the sprinkler system and embodies the computerized control system which regulates the functions of these various components of the plant air purifier. This same PCBA has a conformal coating 1303 to protect against moisture. Various of the elements on the board have pin attachments 1304 for easy coupling of certain components so that if any component needs replacement it can simply be detached and a new one attached in its place, thus eliminating costly shipping and repair expense to the consumer since he can now perform the replacement function himself.

Figure 14:
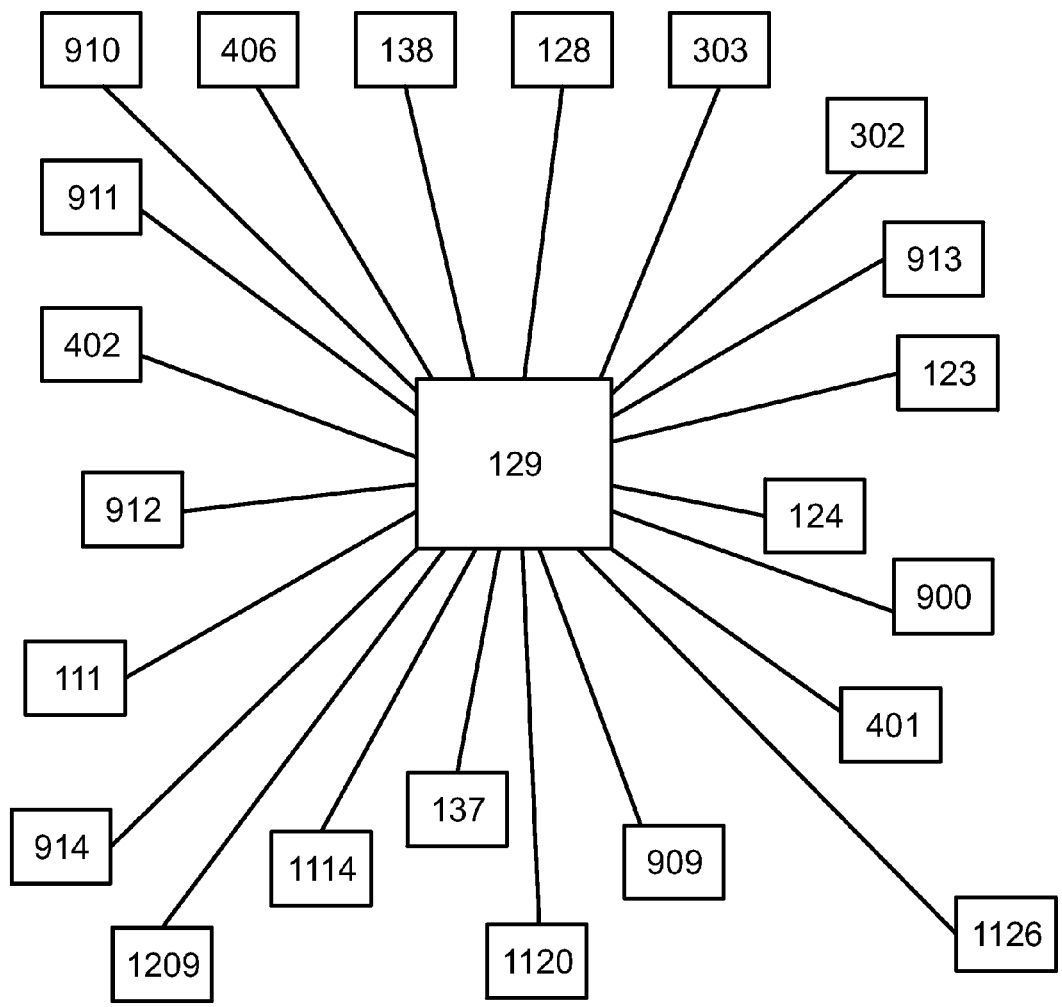
FIG. 14 is a block diagram illustrating the receipt of sensory data, and the control of various system components, by the control system.

FIG. 14 is a block diagram illustrating various of the components which are part of the portable plant air purifier in its various forms which are controlled by and/or provide information to the printed circuit board assembly 129. This PCBA helps the plant air purifier to function. It provides the sequencing of these functions and allows for the interrelationship of one component of the plant air purifier with another.

For instance, it is desirable that if the moisture sensor 138 in the filter bed signals that there is less than 50% (or some other predetermined percentage between 1% and 70% by increments of 1%) of moisture in the filter bed, then the air movement mechanism 124, e.g., induction fan, is shut off and the water pump 111 is activated which pumps water through the emitters in the micro irrigation system and saturates the filter bed. When the moisture sensor shows 50% moisture or greater (or some other predetermined percentage between 30% and 100% by increments of 1%) in the filter bed and the water pump is running, the pump shuts off and a few (e.g. one or two or three or four or five) minutes thereafter the induction fan goes back on. This delay provided more than enough time for the excess water in the filter bed to drain into the hollow cavity below the filter bed and travel down the drain to return to the reservoir, thus preventing the excess water from being sucked up by the induction fan and spewed out into the atmosphere.

This same PCBA has internal timers within it which allow for the photometer 402 to measure the amount of light in the room in which the plant air purifier is located and to activate the grow light, 401/900, if light is not sufficient within the room at a particular time. By the same token the control system has the capability of turning off the grow lamp if it is on at 59 minutes after the hour and then as the next hour (at some other predetermined time sequence) strikes to repeat the process and if there not adequate light for the plant at that time and more light is needed, then the grow lamp is activated again.

Now there are many functions which the computerized control system is designed to help regulate and so the following devices are attached thereto: the alarm light 910, the alarm buzzer 911, the LEDs 406, the filter bed moisture sensor 138, the control panel 128, the key pad 303, the visual display 302, the UV light 123, the air mover mechanism 124, the LED grow lamp for overhead lighting 900 and/or the LED grow lights on the top surface of the unit which points up at the leaves 401, the backup battery 909, the reservoir water level sensor 137, the reservoir moisture sensor 1114, the water pump 111 or 1209 attached to the micro irrigation system, the photometer 402, the solenoid which opens a water feed from the structure in which the plant air purifier is placed 1120, the solenoid or drain valve which opens up the drain so water within the reservoir can run into the structure's plumbing 1126, and the motion sensor 914, for example, not limitation. By having such computerized control system, many functions of the plant air purifier can run automatically. This not only lessen the amount of work the user of the system has to do, but it ensures the health and longevity of the plants and the microbes and maximized the air purification efficiency of the unit.

Among the many operational aspect of the invention which are controlled by the control system embodied, for example, in the PCBA, are the following:

The ability to program what time of the day for the blower or air movement mechanism to start up.
The ability to program what time of the day for the blower or air movement mechanism to shut down.
The capability of start up and shut down for various components to go into effect based on day of the week, holidays, etc.
Turning off the fan when water in the reservoir gets too low.
Turning off the fan when the sprinkler system is on.
Turning off the fan for a designated period after the sprinkler has been functioning so excess water has time to run through the filter bed and down the drain.
Turning on the fan after a designated period of time after the sprinkler has stopped assuming that is during a time period when the fan and air purifier should be operating.
Activating an alarm when water is below a certain point in the water reservoir providing that time when it occurs is not when it is dark in the room or when it is not before a certain time of the day, for example. These settings are programmable, so could be varied at will.
Activating a sound alarm when the time when it would have sounded was too early according to the program and now the time is reached, if water is still below a certain point in the water reservoir.
Turning off a sound alarm which is going when water reaches a point in the reservoir above a certain point.
Turning on a visual warning light when water goes below a certain height in the reservoir.
Turning off a visual warning light which has been on when water in the reservoir reaches a certain point.
Turning on (or off) a grow lamp when a certain time is reached and when light in the room is darker than a certain level.
Turning off a grow lamp when a certain time is reached and the grow lamp is on.
Turning on the fan mechanism when there is motion in a room.
Turning on the sprinkler system when water in the filter bed drops below a certain level.
Turning off the sprinkler system when the moisture level in the filter bed rises above a certain level.
Programming the different times and schedules for different operations.
Allowing water to enter the water reservoir from an in house feed when water drops below a certain level in that reservoir and after water has had time to drain down through the filter bed after the sprinkler system has gone off.
Opening and closing the solenoid which allows water to enter the water reservoir.
Opening and closing the solenoid valve which allows water in the reservoir to drain away.
Activating the visual display.
Overriding any programs.
Activating the backup battery when the in house current is disconnected so as to save the settings.

Figure 15:
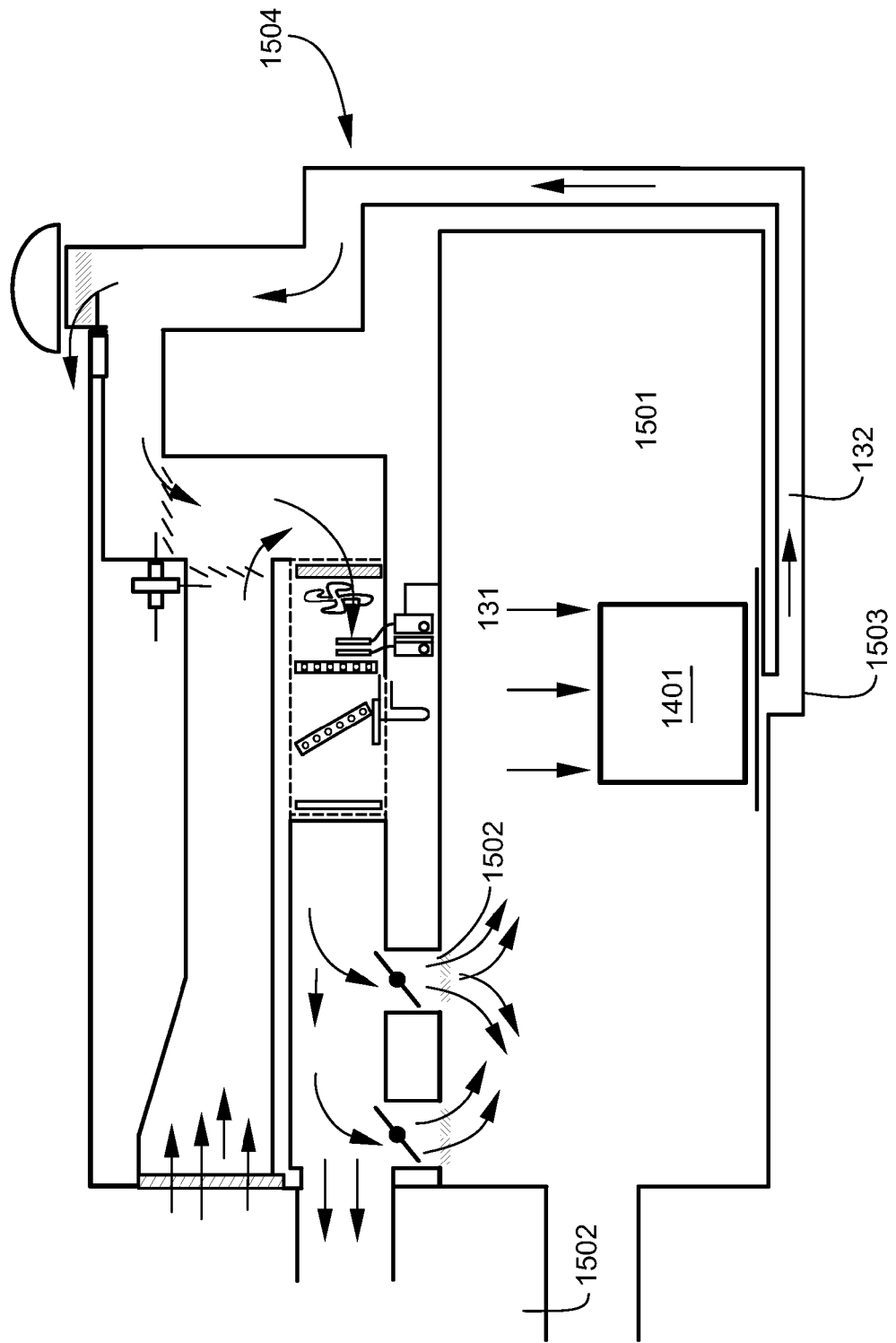
FIG. 15 illustrates a high efficiency plant purifier placed in a room.

FIG. 15 illustrates a high efficiency plant purifier 1401 placed in a room 1501 in which all stale and contaminated air 131 from the entire structure is directed via ducts and registers 1502 into the area within the structure where the plant air purifier is found. The impure air is pulled down into the filter bed in which the plants grow, and the purified air 132 is than ducted via a fresh air duct 1503 out of the room into the HVAC system 1504 of the building itself, where it then re-circulates throughout the building.

Figure 16:
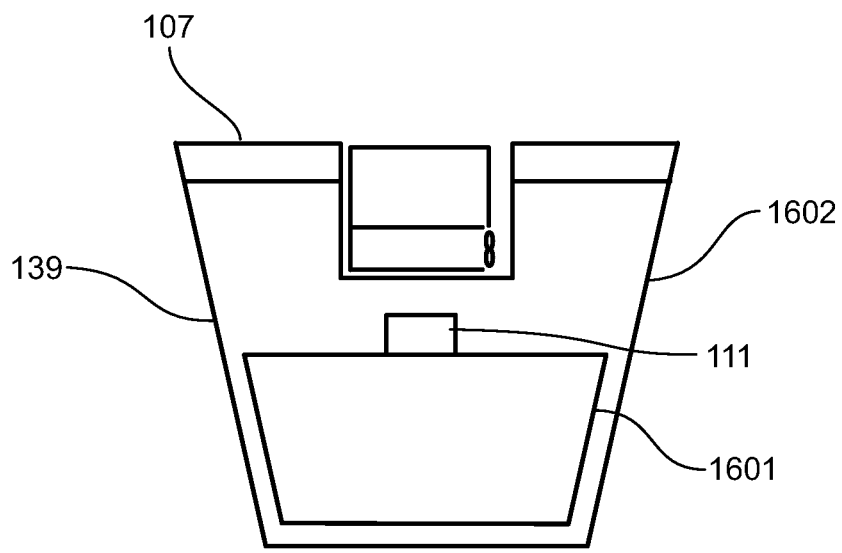
FIG. 16 illustrates yet another alternative embodiment of the invention in which the reservoir is a drop-in unit.

FIG. 16 illustrates an alternative embodiment of the invention. In this case the reservoir is a drop-in unit 1601 dropped into an outer shell as opposed to it being part of the outer housing 139. The water pump 111 is placed on top of the reservoir and like what is shown in FIG. 2 the box 107 is a drop in unit as well which contains the grow pot and the fan motor etc. In this way these components can be dropped into a pre-manufactured pot 1602 that the user buys at a local store. This allows the user to find an outer housing such as a large plant pot that he or she likes and so purchase an outer housing with a preferred style.

Figure 17:
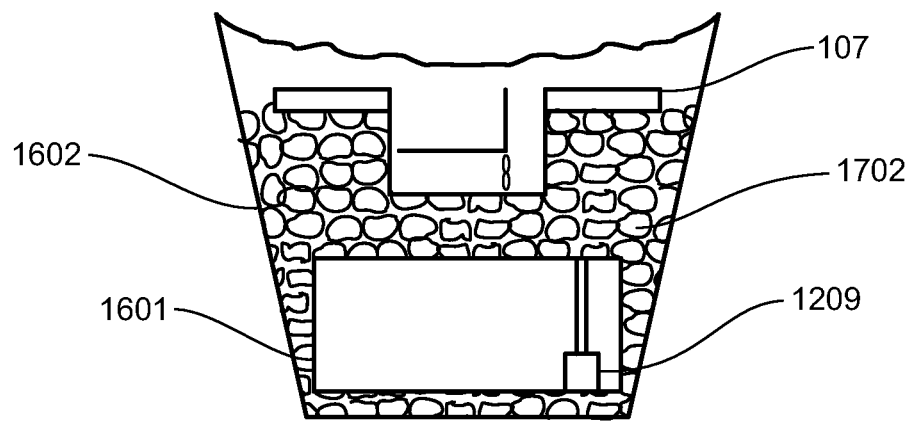
FIG. 17 illustrates a side view where a pre-manufactured outer housing houses the drop-in reservoir and box.

FIG. 17 illustrates a side view where the pre-manufactured outer housing 1602, such as a large plant pot which is decorative in nature, houses the drop in reservoir 1601 and box 107. But in this case the water pump is a submersible pump 1209. Both the drop-in reservoir and the box are not custom fitted to the particular pre-manufactured outer housing 1602 in which they are contained, but there is enough room within this pre-manufactured outer housing for them to fit comfortably within. Wood chips, Styrofoam or some other filler material 1702 is placed within the pre manufactured outer housing of the buyer's choice so as to level the box, stabilize the individual components and to fill up any empty space within. The use of such filler material allows for an unlimited varieties of outer shells with many shapes and dimensions and may also deaden the sound of certain of the mechanisms such as the air movement mechanism.

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A plant air purifier, comprising:
a filter bed;
at least one plant growing within said filter bed;

a mechanical watering device which waters said filter bed from the top down;
an air propulsion mechanism for propelling air through said filter bed; and
a computerized control system controlling said air propulsion mechanism by at least one of: shutting off said air propulsion mechanism based upon when said mechanical watering device is watering said filter bed; and turning on said air propulsion mechanism based upon water having substantially ceased draining though said filter bed.

2. The plant air purifier of claim 1, further comprising a grow lamp for providing light to said at least one plant, comprising at least one light emitting diode (LED).

3. The plant air purifier of claim 1, further comprising:
a reservoir for containing water for watering said at least one plant; and
said computerized control system shutting off said air propulsion mechanism, responsive to detecting when said reservoir is low on water.

4. The plant air purifier of claim 1, further comprising said computerized control system shutting off said air propulsion mechanism when said mechanical watering device is watering said filter bed.

5. The plant air purifier of claim 1, further comprising said computerized control system deactivating said air propulsion mechanism from functioning for a time period after said mechanical watering device has ceased watering said filter bed, to allow excess water within said filter bed to substantially drain through said filter bed due to gravity without being propelled by the air propulsion mechanism whereby it might overly saturate the indoor air of a habitable structure.

6. The plant air purifier of claim 5, further comprising:
a moisture sensor for sensing moisture within said filter bed; wherein:
said time period is determined by said moisture sensor sensing that said excess water has substantially drained though said filter bed.

7. The plant air purifier of claim 1, further comprising:
a light sensitive device for sensing a degree of ambient light in a space in which said air purifier is placed;
a grow lamp for providing light to said at least one plant; and
said computerized control system controlling activation and deactivation of said grow lamp responsive to said sensing said degree of ambient light.

8. The plant air purifier of claim 7, said computerized control system activating said grow lamp responsive to determining that said degree of ambient light is insufficient for said at least one plant.

9. The plant air purifier of claim 1, further comprising:
a light sensitive device for sensing a degree of ambient light in a space in which said air purifier is placed; and
said computerized control system controlling activation and deactivation of said air propulsion mechanism responsive to said sensing said degree of ambient light.

10. The plant air purifier of claim 9, said computerized control system activating or deactivating said air propulsion mechanism responsive to determining that said space is substantially dark.

11. The plant air purifier of claim 1, said mechanical watering device comprising a micro-irrigation system comprising at least one irrigation source outlet for delivering water to said filter bed in a substantially-uniform fashion.

12. The plant air purifier of claim 1, further comprising at least one plant support selected from the group consisting of: a canopy; a trellis; wires; and strands; for substantially preventing plants rooted in said filter bed from contacting said filter bed, thereby facilitating said delivering water to said filter bed in a substantially-uniform fashion.

13. The plant air purifier of claim 1, further comprising said computerized control system for performing at least one control function selected from the control function group consisting of:
operating said air propulsion mechanism based on when said mechanical watering device is watering said filter bed;
operating said air propulsion mechanism based on a time of day;
operating said air propulsion mechanism based on a day of the week;
operating a grow lamp for providing light to said at least one plant, based on a time of day;
actuating a signal discernable by a user when water in said reservoir is low;
operating said grow lamp based on a degree of ambient light in a space in which said air purifier is placed;
operating said mechanical watering device based on a time of day; and
operating said mechanical watering device based sensing a moisture content in said filter bed.

14. The plant air purifier of claim 13, further comprising a user input/output device for a user to program said computerized control system and thereby predetermine the control functions controlled thereby.

15. The plant air purifier of claim 1, further comprising ultraviolet light for application to air flowing out of said filter bed, for reducing mold and mildew.

16. The plant air purifier of claim 1, further comprising said computerized control system for receiving sensed information from at least one sensor selected from the sensor group consisting of:
a moisture sensor for sensing moisture in said filter bed;
a level sensor for sensing a water level in said reservoir;
a light sensitive device for sensing a degree of ambient light in a space in which said air purifier is placed; and
a motion sensor for sensing motion nearby to said air purifier; and
said computerized control system, responsive to at least one of said sensors, for performing at least one control function selected from the control function group consisting of:
operating a LED grow lamp for providing light to said at least one plant;
operating said air propulsion mechanism;
applying ultraviolet to air flowing out of said filter bed, for reducing mold and mildew;
actuating a signal discernable by a user when a condition exists which requires user attention; and
operating said mechanical watering device.

17. The plant air purifier of claim 1, further comprising said computerized control system for receiving sensed information from at least two sensors selected from the sensor group consisting of:
a moisture sensor for sensing moisture in said filter bed;
a level sensor for sensing a water level in said reservoir;
a light sensitive device for sensing a degree of ambient light in a space in which said air purifier is placed; and
a motion sensor for sensing motion nearby to said air purifier:
said computerized control system, responsive to at least one of said sensors, for performing at least three control functions selected from the control function group consisting of:

operating a LED grow lamp for providing light to said at least one plant;
operating said air propulsion mechanism;
applying ultraviolet to air flowing out of said filter bed, for reducing mold and mildew;
actuating a signal discernable by a user when a condition exists which requires user attention; and
operating said mechanical watering device.

18. The plant air purifier of claim 1, further comprising said computerized control system for receiving sensed information from:
a moisture sensor for sensing moisture in said filter bed;
a level sensor for sensing a water level in said reservoir;
a light sensitive device for sensing a degree of ambient light in a space in which said air purifier is placed; and
a motion sensor for sensing motion nearby to said air purifier:
said computerized control system, responsive to at least one of said sensors, for performing the control functions of:
operating a LED grow lamp for providing light to said at least one plant;
operating said air propulsion mechanism;
applying ultraviolet to air flowing out of said filter bed, for reducing mold and mildew;
actuating a signal discernable by a user when a condition exists which requires user attention; and
operating said mechanical watering device.

19. The plant air purifier of claim 1, further comprising pumping some of said water to a bottom of said filter bed and thereby watering said filter bed from a bottom up in addition to said watering the filter bed from the top down.

20. The plant air purifier of claim 1, integrated into a ducting system of a habitable structure in which said air purifier is placed.

21. The plant air purifier of claim 1, further comprising:
a motion sensor for sensing motion nearby to said air purifier;
said computerized control system responsive to said motion sensor for performing at least one control function selected from the control function group consisting of:
operating a LED grow lamp for providing light to said at least one plant;
operating said air propulsion mechanism;
applying ultraviolet to air flowing out of said filter bed, for reducing mold and mildew;
actuating a signal discernable by a user when a condition exists which requires user attention; and
operating said mechanical watering device.

22. A method for purifying air using a plant air purifier, comprising:
providing a filter bed;
growing at least one plant within said filter bed;
watering said filter bed from the top down, using a mechanical watering device;
propelling air through said filter bed using an air propulsion mechanism; and
controlling said air propulsion mechanism using a computerized control system by at least one of: shutting off said air propulsion mechanism based upon when said mechanical watering device is watering said filter bed; and turning on said air propulsion mechanism based upon water having substantially ceased draining though said filter bed.

23. The method of claim 22, further comprising providing light to said at least one plant, using a grow lamp comprising at least one light emitting diode (LED).

24. The method of claim 22, further comprising:
containing within a reservoir, water for watering said at least one plant; and
shutting off said air propulsion mechanism, responsive to detecting when said reservoir is low on water.

25. The method of claim 22, further comprising shutting off said air propulsion mechanism, when said mechanical watering device is watering said filter bed.

26. The method of claim 22, further comprising deactivating said air propulsion mechanism from functioning for a time period after said mechanical watering device has ceased watering said filter bed, to allow excess water within said filter bed to substantially drain through said filter bed due to gravity without being propelled by the air propulsion mechanism whereby it might overly saturate the indoor air of a habitable structure.

27. The method of claim 26, further comprising determining said time period in response to a moisture sensor for sensing moisture within said filter bed sensing that said excess water has substantially drained though said filter bed.

28. The method of claim 22, further comprising activating and deactivating a grow lamp for providing light to said at least one plant, responsive to sensing a degree of ambient light using a light sensitive device.

29. The method of claim 28, further comprising activating said grow lamp responsive to determining that said degree of ambient light is insufficient for said at least one plant.

30. The method of claim 22, further comprising activating and deactivating said air propulsion mechanism responsive to sensing a degree of ambient light using a light sensitive device.

31. The method of claim 30, further comprising activating or deactivating said air propulsion mechanism responsive to determining that said space is substantially dark.

32. The method of claim 22, further comprising delivering water to said filter bed in a substantially-uniform fashion, using said mechanical watering device comprising a micro-irrigation system comprising at least one irrigation source outlet thereof.

33. The method of claim 22, further comprising supporting said at least one plant using at least one plant support selected from the group consisting of: a canopy; a trellis; wires; and strands; for substantially preventing plants rooted in said filter bed from contacting said filter bed, thereby facilitating said delivering water to said filter bed in a substantially-uniform fashion.

34. The method of claim 22, further comprising performing at least one control function selected from the control function group consisting of:
operating said air propulsion mechanism based on when said mechanical watering device is watering said filter bed;
operating said air propulsion mechanism based on a time of day; operating said air propulsion mechanism based on a day of the week;
operating a grow lamp for providing light to said at least one plant, based on a time of day;
actuating a signal discernable by a user when water in said reservoir is low;
operating said grow lamp based on a degree of ambient light in a space in which said air purifier is placed;
operating said mechanical watering device based on a time of day; and operating said mechanical watering device based sensing a moisture content in said filter bed.

35. The method of claim 34, further comprising a user programming and thereby predetermining, said control functions.

36. The method of claim 22, further comprising reducing mold and mildew by applying ultraviolet light to air flowing out of said filter bed.

37. The method of claim 22, further comprising receiving sensed information from at least one sensor selected from the sensor group consisting of:
    a moisture sensor for sensing moisture in said filter bed;
    a level sensor for sensing a water level in said reservoir;
    a light sensitive device for sensing a degree of ambient light in a space in which said air purifier is placed; and
    a motion sensor for sensing motion nearby to said air purifier; and
    responsive to at least one of said sensors, performing at least one control function selected from the control function group consisting of:
    operating a LED grow lamp for providing light to said at least one plant;
    operating said air propulsion mechanism;
    applying ultraviolet to air flowing out of said filter bed, for reducing mold and mildew;
    actuating a signal discernable by a user when a condition exists which requires user attention; and
    operating said mechanical watering device.

38. The method of claim 22, further comprising receiving sensed information from at least two sensors selected from the sensor group consisting of:
    a moisture sensor for sensing moisture in said filter bed;
    a level sensor for sensing a water level in said reservoir;
    a light sensitive device for sensing a degree of ambient light in a space in which said air purifier is placed; and
    a motion sensor for sensing motion nearby to said air purifier; and
    responsive to at least one of said sensors, performing at least three control functions selected from the control function group consisting of:
    operating a LED grow lamp for providing light to said at least one plant;
    operating said air propulsion mechanism;
    applying ultraviolet to air flowing out of said filter bed, for reducing mold and mildew;
    actuating a signal discernable by a user when a condition exists which requires user attention; and
    operating said mechanical watering device.

39. The method of claim 22, further comprising receiving sensed information from:
    a moisture sensor for sensing moisture in said filter bed;
    a level sensor for sensing a water level in said reservoir;
    a light sensitive device for sensing a degree of ambient light in a space in which said air purifier is placed; and
    a motion sensor for sensing motion nearby to said air purifier; and
    responsive to said sensors:
    operating a LED grow lamp for providing light to said at least one plant;
    operating said air propulsion mechanism;
    applying ultraviolet to air flowing out of said filter bed, for reducing mold and mildew;
    actuating a signal discernable by a user when a condition exists which requires user attention; and
    operating said mechanical watering device.

40. The method of claim 22, further comprising pumping some of said water to a bottom of said filter bed and thereby watering said filter bed from a bottom up in addition to said watering the filter bed from the top down.

41. The method of claim 22, further comprising integrating said plant air purifier into a ducting system of a habitable structure in which said air purifier is placed.

42. The method of claim 22, further comprising:
    responsive to sensing motion nearby to said air purifier, performing at least one control function selected from the control function group consisting of:
    operating a LED grow lamp for providing light to said at least one plant;
    operating said air propulsion mechanism;
    applying ultraviolet to air flowing out of said filter bed, for reducing mold and mildew;
    actuating a signal discernable by a user when a condition exists which requires user attention; and
    operating said mechanical watering device.

43. The plant air purifier of claim 1, said filter bed comprising a surface which is horizontal within 20 degrees of a horizontal plane.

44. The method of claim 22, further comprising providing said filter bed comprising a surface which is horizontal within 20 degrees of a horizontal plane.

* * * * *